United States Patent
Macrae et al.

(10) Patent No.: US 6,233,734 B1
(45) Date of Patent: *May 15, 2001

(54) SYSTEM AND METHOD FOR CONTROLLING THE BROADCAST AND RECORDING OF TELEVISION PROGRAMS AND FOR DISTRIBUTING INFORMATION TO BE DISPLAYED ON A TELEVISION SCREEN

(75) Inventors: Douglas B. Macrae, Weston; Thomas E. Westberg, Sudbury, both of MA (US)

(73) Assignee: Videoguide, Inc., Bedford, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/260,117

(22) Filed: Mar. 2, 1999

Related U.S. Application Data

(63) Continuation of application No. 08/942,253, filed on Oct. 1, 1997, now Pat. No. 6,052,145, which is a continuation of application No. 08/369,525, filed on Jan. 5, 1995, now abandoned.

(51) Int. Cl.[7] .................................................. H04N 5/445
(52) U.S. Cl. ................................. 725/50; 725/54; 725/44
(58) Field of Search .................................... 709/217, 219; 345/327, 328; 455/3.1, 5.1, 4.1, 4.2; 348/906, 460, 563, 569, 564, 10

(56) References Cited

U.S. PATENT DOCUMENTS

| | | | |
|---|---|---|---|
| 4,706,121 | 11/1987 | Young | 348/906 |
| 4,751,578 | 6/1988 | Reiter et al. | 348/906 |
| 4,961,109 | 10/1990 | Tanaka | 348/10 |
| 5,016,273 | 5/1991 | Hoff | 348/563 |
| 5,210,611 | * 5/1993 | Yee et al. | 348/906 |
| 5,253,066 | 10/1993 | Vogel | 358/188 |
| 5,321,514 | * 6/1994 | Martinez | 348/725 |
| 5,371,795 | 12/1994 | Vogel | 348/10 |
| 5,489,894 | 2/1996 | Murray | 348/563 |
| 5,508,815 | 4/1996 | Levine | 348/506 |
| 5,589,892 | 12/1996 | Knee et al. | 348/731 |
| 5,689,799 | * 11/1997 | Dougherty et al. | 348/6 |
| 5,729,549 | 3/1998 | Kostreski et al. | 370/522 |
| 5,781,246 | 7/1998 | Alten et al. | 348/569 |
| 5,812,931 | * 9/1998 | Yuen | 348/12 |
| 5,818,441 | 10/1998 | Throckmorton | 345/328 |

\* cited by examiner

*Primary Examiner*—Victor R. Kostak
(74) *Attorney, Agent, or Firm*—Christie, Parker & Hale, LLP

(57) ABSTRACT

A system is disclosed for providing programming and other information to television viewers for enabling them to control their respective television receivers. A central broadcasting computer and associated memory gathers and stores the information to be provided, and broadcasts it in a viewing area. An information receiver positioned in close proximity to the television is linked to said central broadcasting computer to receive signals representing said information from said central broadcasting computer. The received signals are converted video displays viewable on the television receiver's screen, and the user can use the displays to control the television receiver and other devices, such as video cassette recorders, used with the television receiver.

13 Claims, 21 Drawing Sheets

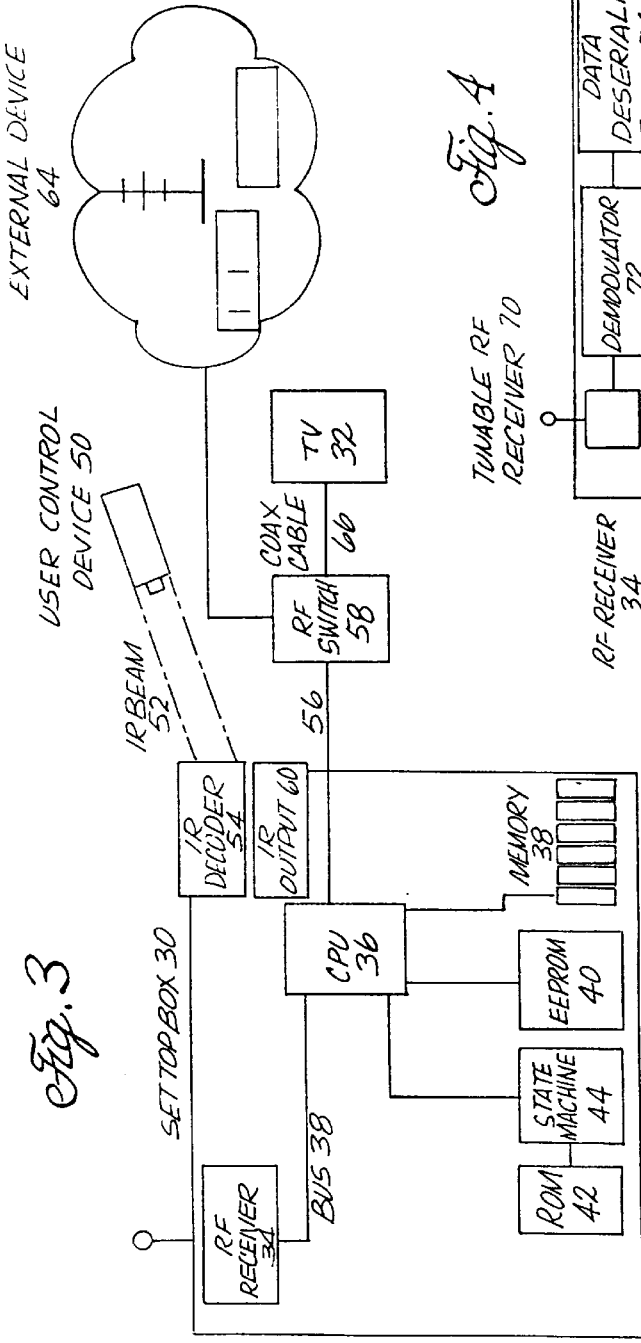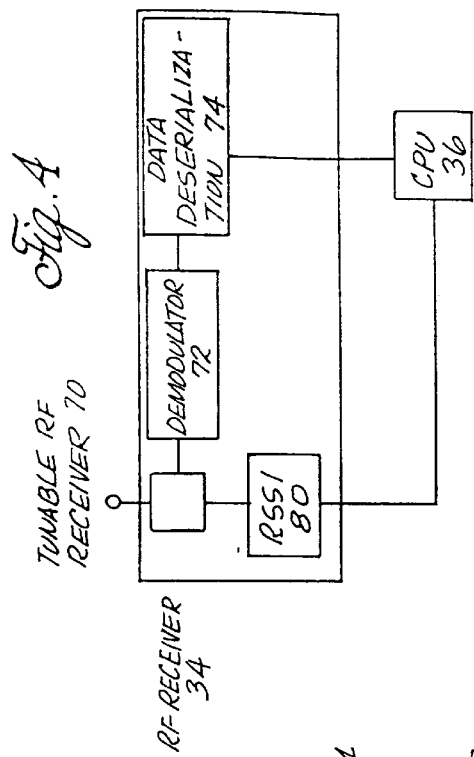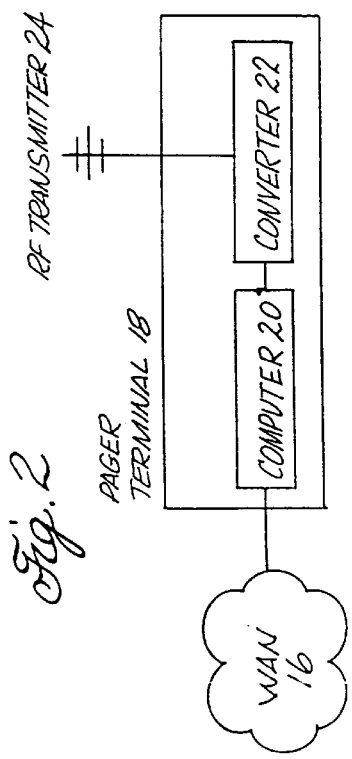

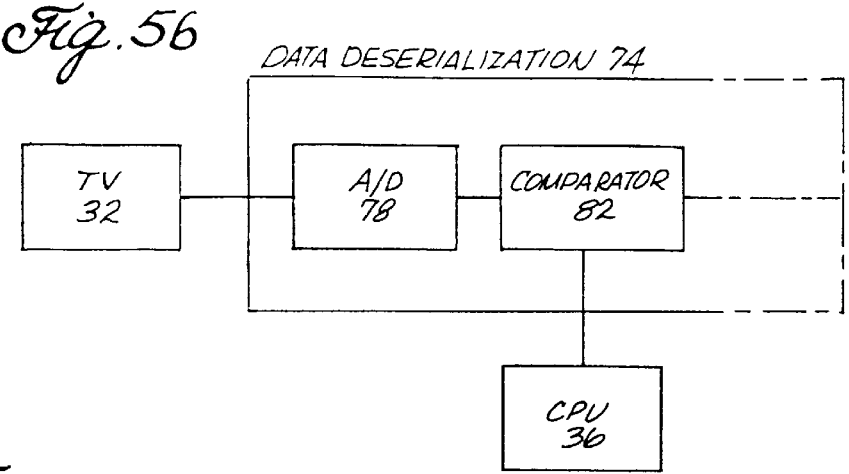
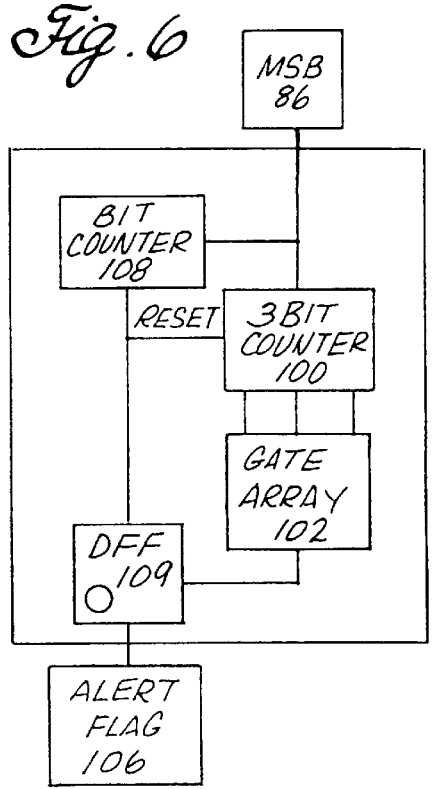
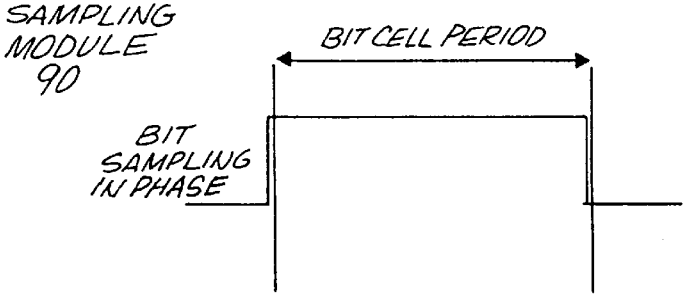
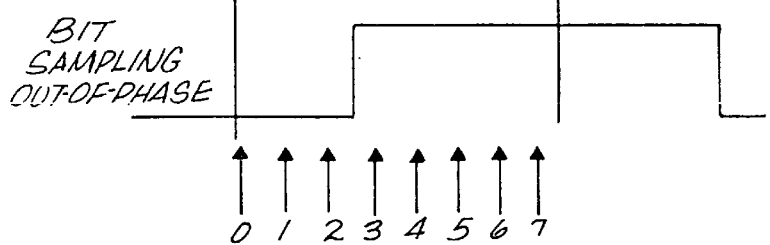

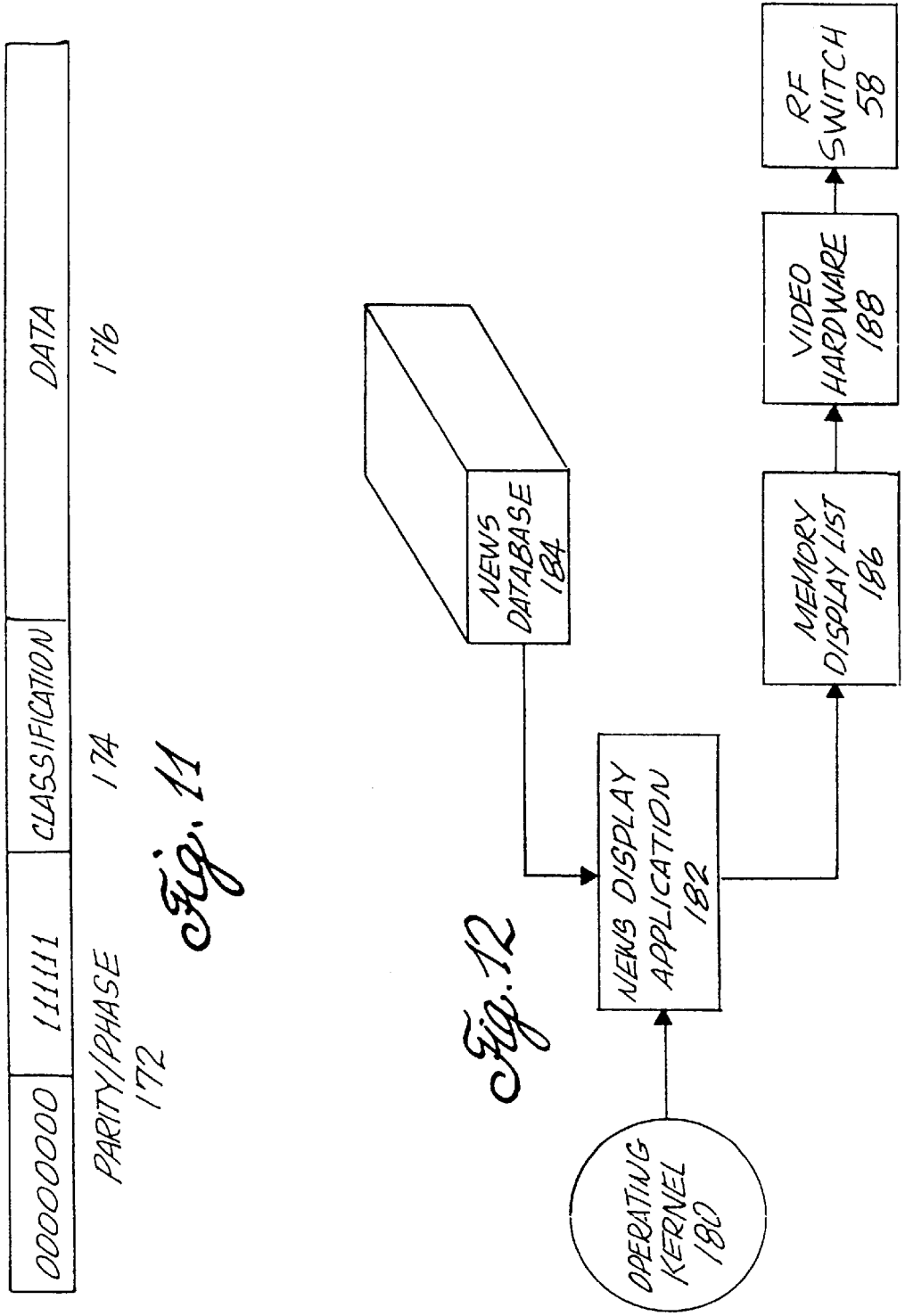

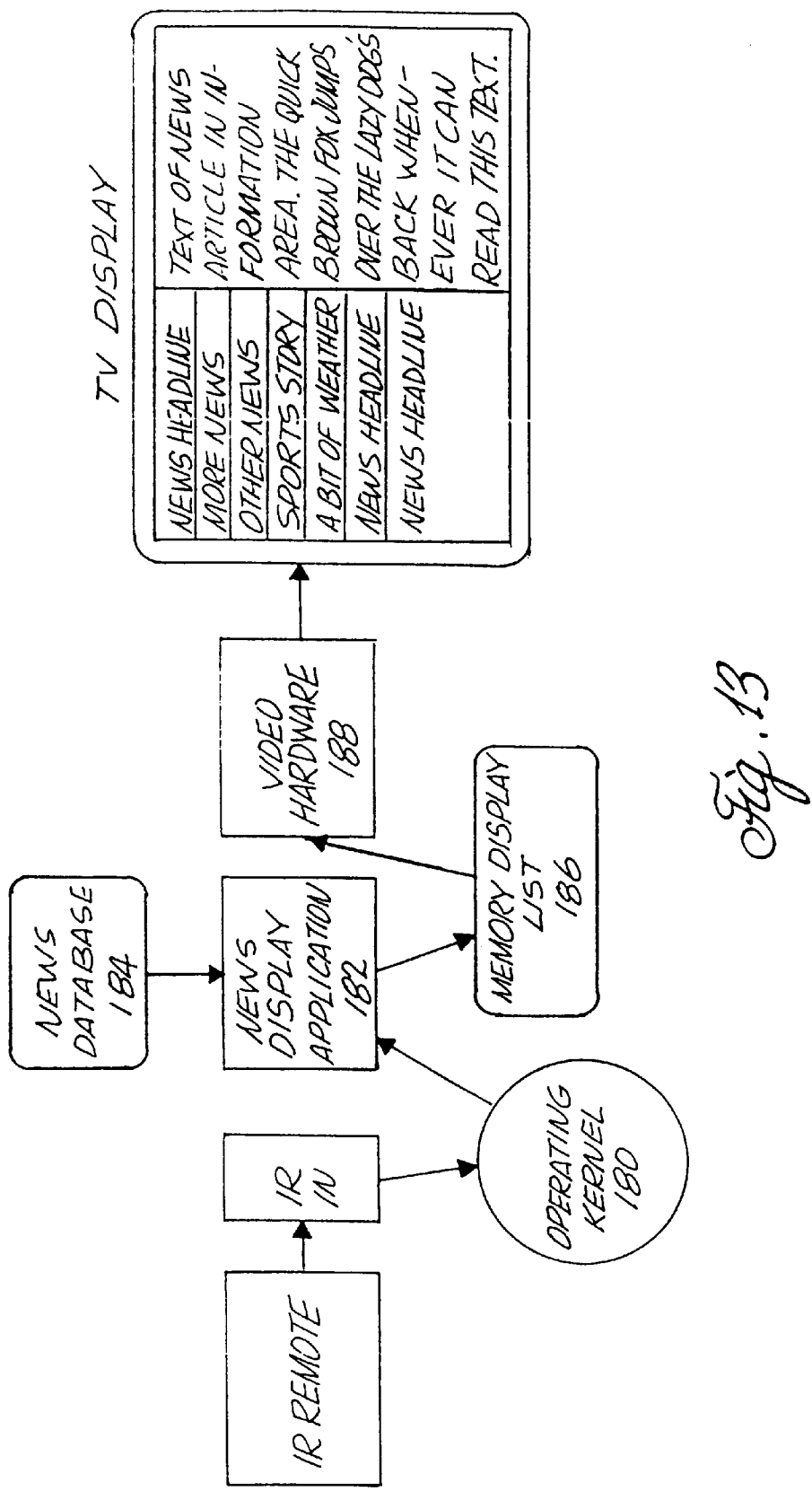

Fig. 16

| PROGRAM GUIDE | | 8:30 PM | RECORD | NEXT DAY ▲ | 8:00 |
|---|---|---|---|---|---|

SCREEN TITLE — SOFT KEY DEFINITION — BANNER AREA 240

SCROLLING AREA 240

HIGHLIGHTED TILE 244

| MONDAY | 8:30 PM | 9:00 PM | 9:30 PM |
|---|---|---|---|
| CBS [2] | DAVE'S WORLD | MURPHY BROWN | LOVE & WAR |
| HBO | SUPERMAN II | | |
| NBC [4] | BLOSSOM | A CHILD'S CRY FOR HELP | |
| FOX [5] | ◁ MELROSE PLACE | PARTY OF FIVE | |
| ABC [7] | COACH | FOOTBALL: BILLS AT STEELERS | |
| ESPN | ◁ NFL PRIME MON... | AUTO RACE: ARCA SERIES | |
| CNN | ◁ PRIMENEWS | LARRY KING LIVE | |

SUPERMAN II, 4:45PM, FANTASY, [PG] (VIOLENCE, ADULT SITUATIONS), (1980) A NUCLEAR EXPLOSION FREES THREE SUPERHUMAN VILLAINS WHO WERE ORIGINALLY IMPRISONED BY SUPERMAN'S KRYPTONIAN FATHER, CHRISTOPHER REEVE, MARGOT KIDDER, GENE HACKMAN. DIRECTOR: RICHARD LESTER. (2:15)

INFORMATION AREA 246

Fig. 18

| PROGRAM GUIDE | | RECORD | ◯ | NEXT DAY ▷ | 8:00 |
|---|---|---|---|---|---|
| MONDAY | 8:30 PM | | 9:00 PM | | 9:30 PM |
| CBS ② | DAVE'S WORLD | | MURPHY BROWN | | LOVE & WAR |
| HBO | SUPERMAN II | | | ▲ | |
| NBC ④ | BLOSSOM | | A CHILD'S CRY FOR HELP | | ◁ |
| FOX ⑤ | ◁ MELROSE PLACE | | PARTY OF FIVE | | ◁ |
| ABC ⑦ | COACH | | FOOTBALL: BILLS AT STEELERS | | ◁ |
| ESPN | ◁ NFL PRIME MON... | | AUTO RACE: ARCA SERIES | | |
| CNN | ◁ PRIME NEWS | | LARRY KING LIVE | | |

SUPERMAN II, 4:45, FANTASY [PG] (VIOLENCE, ADULT SITUATIONS), (1980) A NUCLEAR EXPLOSION FREES THREE SUPERHUMAN VILLAINS WHO WERE ORGINALLY IMPRISONED BY SUPERMAN'S KRYPTONIAN FATHER. CHRISTOPHER REEVE, MARGOT KIDDER, GENE HACKMAN. DIRECTOR: RICHARD LESTER. (2:15)

PROGRAM GRID 260
TITLE 262
INFORMATION AREA 263

| NEWS GUIDE | THE VIDEO GUIDE NEWS | ☀ 50° 35° | 5:17 |
|---|---|---|---|
| DOW ↑ 4.50 4073.35 | | NEXT | |

| | STORMS DELAY SHUTTLE'S RETURN |
|---|---|
| SHUTTLE'S RETURN DELAYED | SPACE CENTER, HOUSTON (AP) – NASA PASSED ON ITS FIRST CHANCE TO BRING SHUTTLE ENDEAVOUR HOME FROM A RECORD-LONG JOURNEY FRIDAY BECAUSE OF BAD WEATHER AT THE FLORIDA LANDING SITE. A STORM FRONT CROSSED THE FLORIDA PENINSULA AND BROUGHT OVERCAST SKIES AND SPORADIC LIGHT RAIN, EVEN A CHANCE FOR HAIL, TO CAPE CANAVERAL, FLA. MISSION CONTROL NIXED THE FIRST LANDING ▶ |
| NEWS GUIDE BRIEFS | |
| ISR-SYR TALKS TO RESUME | |
| KHOMEINI'S SON DEAD | |
| DEATH NET ACCESS BLOCKED | |
| YELTSIN OFFER MULLED | |
| LIGHTNING STRIKES CHURCH | |
| LOCAL WEATHER | |

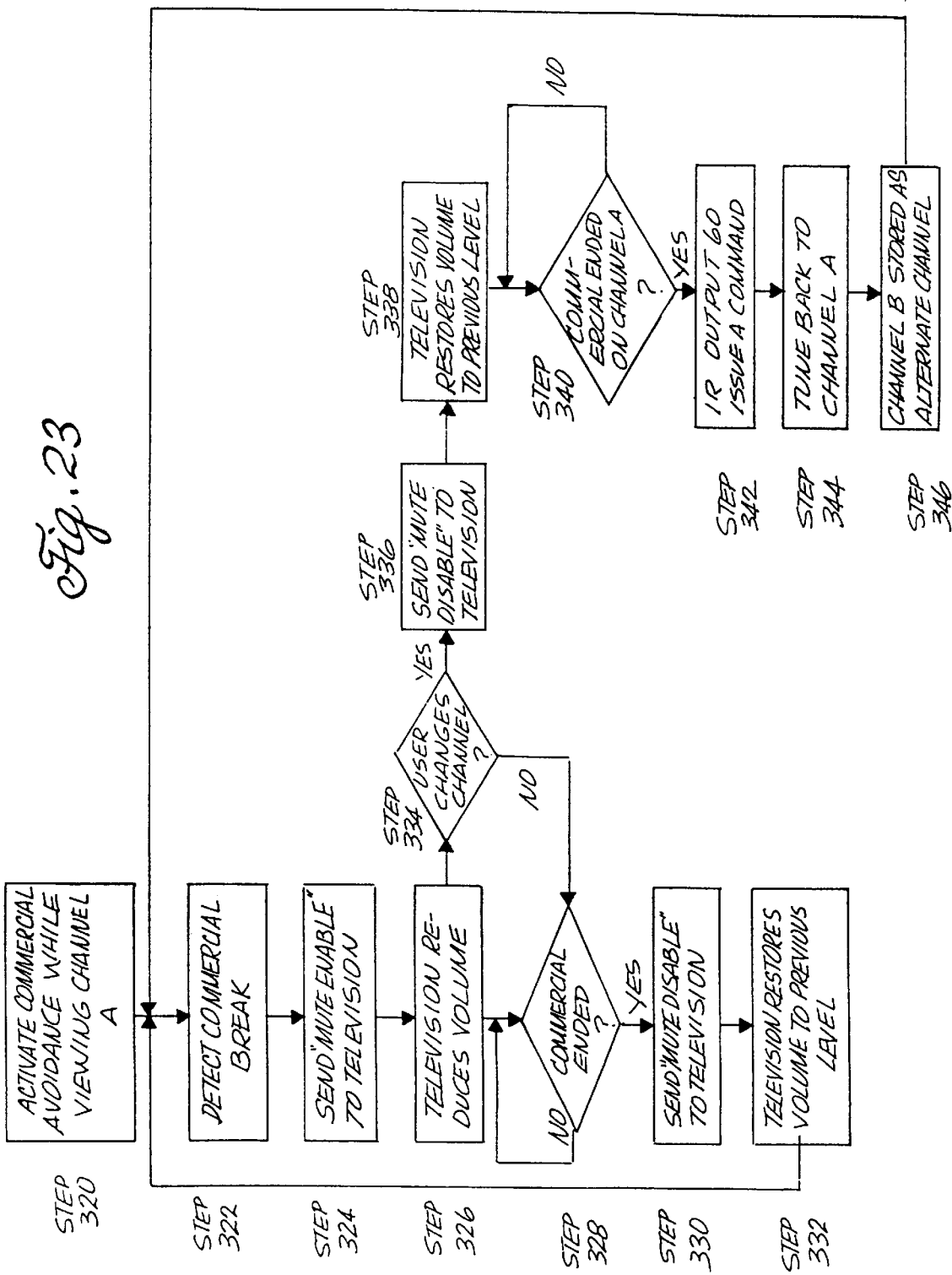

SYSTEM AND METHOD FOR CONTROLLING THE BROADCAST AND RECORDING OF TELEVISION PROGRAMS AND FOR DISTRIBUTING INFORMATION TO BE DISPLAYED ON A TELEVISION SCREEN

CROSS-REFERENCE TO RELATED APPLICATIONS

This application is a continuation of application Ser. No. 08/942,253 filed Oct. 1, 1997, now U.S. Pat. No. 6,052,145, which is a continuation of application Ser. No. 08/369,525 filed Jan. 5, 1995, now abandoned, the priorities of which are claimed in the present application.

FIELD OF THE INVENTION

This invention relates to a system and method for controlling the broadcast and recording of television programs and for distributing information to be displayed on a television screen.

BACKGROUND OF THE INVENTION

There are many known systems for controlling the operation of a television and a video recorder and for providing information on a television screen. One of the primary types of information that is displayed to viewers is programming information which may include current program information as well as future program information. Viewers often have a need to access current and future schedule information and often that requires locating an appropriate television directory in either a newspaper or weekly magazine.

For many years, users have also encountered significant difficulties in programming video recorders. In recent years systems have been developed which simplify the recording process so that it is easier for a user to program. These systems (for example, the VCR+ system), however, require that the user locate program listings in some other source before he or she can program the VCR to record. If a program listing includes code information (termed "plus codes"), the user can use depress keys on a VCR+ infrared remote control device in a pattern determined by the code information to, in turn, program the VCR. The code information identifies channel, broadcast time and duration for a program that the user wishes to record. This must be done for each program to be recorded, and for each, for example, weekly episode.

In many known systems which provide programming information to the user, the programming information is loaded at some periodic basis. Television stations, however, often change the programs that will be aired and there is no way for updating such systems of last minute programming changes. Therefore, if a user views programming information on his television and either sets a recorder to record the program or makes plans to be able to watch a program at a certain time and the station changes that programming information, either the wrong program will be recorded or the user would not be able to watch the program that he desired to watch.

In another system, called "Starsight", program information may be broadcast by a television broadcasting station on an interleaved basis while it is broadcasting television programs, in particular during a portion of the television signal termed the "vertical blanking interval." When the information is displayed, a program may be selected for viewing or recording by moving a highlight cursor to a program title on the display and depressing a button on a remote control device. However, it is not economical to guarantee that the information is available in the vertical blanking interval of every transmitted channel, so this system generally cannot receive information updates while channels other than those carrying the information signal are being viewed.

SUMMARY OF THE INVENTION

The invention provides a new and improved system and method for controlling the broadcast and recording of television programs and for distributing information to be displayed on a television screen.

In brief summary, the new system includes a central broadcasting computer which receives television schedule and episode, news, sports and other information from various sources. The central broadcasting computer transmits this information over a wide area network to a multiplicity of radio transmitters covering a wide area, such as the entire continental United States. These transmitters transmit the information to individual set-top boxes in homes and businesses using a reserved nationwide pager frecuency. Each set-top box includes a CPU and a memory means. The broadcast information is processed by the CPU and stored in the memory means until accessed by the user.

Each set-top box is configured so that the user may use a single, ergonomically-designed user control device, such as an IR remote control to control his television and external devices (such as VCRs, video disk players, cable decoders and antennas). Using the user control device, the user can also cause the television to display the broadcast information in various easy-to-understand formats. Among these display screens are grids of television and cable programming organized by channel and time, news headlines and supporting information, and up-to-date sports scores and highlights. By selecting programs or other options from these screens, the user may cause the television to change channels to the desired program or may program the VCR to record certain programs. By selecting other menu options, the user may also cause the television to automatically be muted or switch to another channel during commercial breaks, and to skip commercial breaks when recording programs.

In a preferred embodiment, the RF transmitters broadcast information using the nationwide pager bandwidth around 931 MHz. Information is encoded using any of a number of well-known transmission protocoals, such as the POCSAG protocol or the Motorola FLEX protocol. The system includes a unique method of reducing noise and interpreting broadcast data in this format.

The attainment of the foregoing and related objects, advantages and features of the invention should be more readily apparent to those skilled in the art after review of the following detailed description of the invention, which should be read in conjunction with the accompanying drawings.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2 is a block diagram of a pager terminal used in the system shown in FIG. 1;

FIG. 3 is a block diagram of the components of a set-top box used in the system and process of the present invention for providing information and for controlling the operation of a television and associated external devices;

FIG. 4 is a block circuit diagram of the RF receiver used in the set-box shown in FIG. 3;

FIG. 5b is a block circuit diagram of an alternate embodiment of the comparator operation used in the data deserialization module shown in FIG. 5a;

FIG. 6 is a block circuit diagram of the bit sampling module shown in FIG. 5a;

FIGS. 7a and 7b are representative signal samples processed by the bit sampling module of FIG. 5a;

FIG. 8 is another signal representation which is processed by the bit sampling module shown in FIG. 5a;

FIG. 11 is a data representation of a data record transmitted by the system of the present invention;

FIG. 12 is a diagram illustrating the data flow in a particular application in the system and method of the present invention;

FIG. 13 is a block diagram showing the relationship of various functional components of the system and process of the present invention used for displaying information on a television screen;

FIG. 16 is a flowchart of the steps taken by the system of the present invention in a system set-up operation;

FIG. 18 is a functional diagram of the remote control used in the system of the present invention;

FIG. 19 is a representation of the main screen display generated by the system of the present invention;

FIG. 20 is a representation of a Navigation Screen generated by the system of the present invention;

FIG. 23 is a representation of a News Screen generated by the system of the present invention;

DETAILED DESCRIPTION OF AN ILLUSTRATIVE EMBODIMENT

A. Transmission Network.

Figure 1:
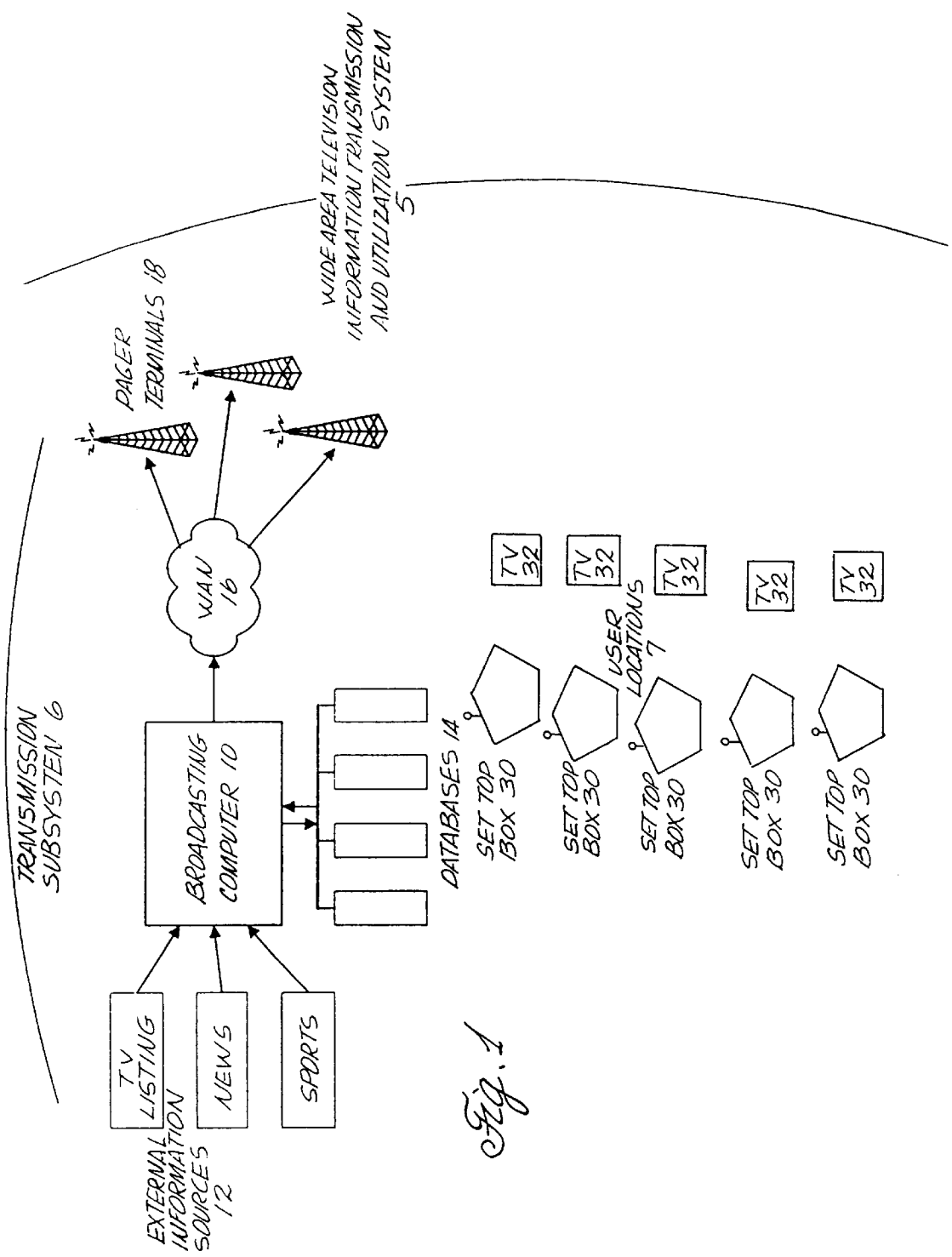
FIG. 1 is a block diagram of the wide area system for transmitting broadcasting information of the present invention.

FIG. 1 depicts a wide area television information transmission and utilization system 5 constructed in accordance with the invention. With reference to FIG. 1, system 5 includes an information transmission subsystem 6 which transmits television scheduling and other information as described below to a plurality of user locations 7. Each user location 7 includes a conventional television receiver, and may include a conventional video cassette recorder (VCR), and a user device that receives the television scheduling and other information and uses this information, along with inputs provided by a user, to control the television receiver and VCR, as also described below.

As shown in FIG. 1, the information transmission subsystem 6 includes a central information broadcasting computer 10, which receives television schedule informaiton, television episode, news, sports, weather and other information (generally identified as "miscellaneous information"), as well as certain command and system information used by the system (generally identified as "system information") from a variety of external information sources 12, including third party vendors, other parts of the subsystem 7, and internal databases. Broadcasting computer 10 stores this scheduling, miscellaneous and system information in its own databases 14 and periodically transmits it electronically (in the manner described below) over wide area network ("WAN") 16 to a plurality of pager terminals 18. In a preferred embodiment, wide area network 16 is a conventional commercial frame relay digital data transmission network which transmits data using the conventional TCP/IP communications protocol.

Referring now to FIG. 2, each pager terminal 18 includes a computer 20 connected to the WAN 16. Computer 20 includes converter 22, which converts the information received from WAN 18, which is received in conventional digital form, into radio frequency (RF) signals suitable for radio transmission. Converter 22 is connected to a high-power RF transmitter 24 which broadcasts the information from pager terminal 18 in the form of analog radio pager signals in the 931 MHz frequency band, which is the frequency band designated for pager use by the Federal Communications Commission. In the preferred embodiment, over one hundred pager terminals are used to cover the continental United States. The information sent to each pager terminal, in particular the scheduling information, is customized to reflect accurate data (program listings, times, etc.) for the geographic region covered by that terminal. The broadcast computer 10 preferably transmits the scheduling, miscellaneous and system information to the pager terminals 18, and the pager terminals 18 preferably broadcasts the information to the user locations 7, during the night, when there is low usage of the pager frequency band. The pager terminals 18 broadcast the information using any of a number of well-known paging transmission protocols, including POCSAG or the Motorola FLEX protocol.

B. User Location 7

Referring again to FIG. 1, as noted above the information transmission subsystem 6, through the pager terminals 18, broadcasts the scheduling, miscellaneous and system information to user locations 7. Each user location 7 includes a user device, identified herein as a set-top box 30, a conventional television receiver 32, and may also include a conventional VCR (not shown). The set-top box 30 receives the scheduling, miscellaneous and system information, and uses the scheduling and miscellaneous information, in particular, to generate information displays which it provides to the television receiver 32 at the user location 7. In addition, by means of a user control device 50 (see FIG. 3), such as a remote control device, the user may provide user information to control the set-top box 30 to, in turn, control the television receiver 32, to, for example, to change channels, display programs at their scheduled times, and also to enable the VCR to facilitate recording of certain programs. For example, the set-top box 30 will receive and store user information relating to displaying certain programs which are broadcast at certain times, and, at the appropriate times will generate appropriate infrared control signals which are received by the television receiver's remote control infrared detector to enable the television to turn itself on (if it is not already on), switch to the appropriate channel and display the program. At the end of the program, the set-top box 30 may enable the television reciever 32 to switch to another program, if a user has enabled that to occur, to remain on at the same channel, or to switch itself off In addition, the set-top box 30 will receive and store user information relating to recording of certain programs which are broadcast at certain times, and will generate the approprate infrared control signals which are received by the VCR's remote control infrared detector to program the VCR to record. The set-top box 30 may also enable the VCR to play the recording over the television receiver 32 at a selected time.

FIG. 3 depicts a functional block diagram of a set-top box 30 useful in a user location 7. With reference to FIG. 3, each set-top box 30 includes an RF receiver 34 which is tuned to receive scheduling, miscellaneous and system information in the 931 MHz band. RF receiver 34, which in one embodiment comprises a conventional receiver used in conventional paging devices, converts this scheduling, miscellaneous and system information from analog to digital form and supplies the scheduling and system information in digital form via bus 38 to a central processing unit ("CPU") 36 included in set-top box 30. In a preferred embodiment, CPU 36 is a standard 16-bit microprocessor which, in one embodiment, comprises a microprocessor selected from the Motorola MC 68000 microprocessor family. CPU 36 processes the digital scheduling and system information and stores it in a memory 38, which in one embodiment comprises a battery-backed random access memory implemented in conventional random access memory chips. In addition, the set-top box 30 includes an EEPROM 40 which stores device information such as a serial number, subscription controls and certain setup information provided during setup of the box 30 as described below. The set-top box 30 also includes a read-only memory ("ROM") 42 which contains the program for controlling CPU 36. In one embodiment, ROM 42 provides 8-bit words, and a latch and state machine 44 enables the ROM 42 to emulate a 16-bit device in communications with CPU 36.

The user control device 50, which in one embodiment is a battery-powered infrared remote control device ('IR remote') produces a low-powered, wide-angle infrared beam 52 which is modulated in response to inputs provided by a user to supply user information, in the form of user commands, to the set-top box 30. Beam 52 is detected by an IR decoder 54 included in set-top box 30 and the received infrared signal is converted into digital signals which are processed by CPU 36.

An RF switch 58 is provided to enable the set-top box 30 to generate RF signals which are displayed by the television receiver 32. The RF signals will provide a video display by the television receiver 32 of scheduling and miscellaneous information provided by the information transmission subsystem 6, thereby enabling the system 5 to display the information to the user. The RF switch is connected to receive signals from set-top box 30 and from an external device 64 (which may be the VCR, a video disc player, a cable decoder or television antenna), and to provide signals via a coaxial cable 66 to the television 32. If the set-top box 30 is not providing an RF signal to RF switch 58, then RF switch 58 will pass signals provided by the external device 64 to television 32. On the other hand, if the set-top box 30 is providing an RF signal to the RF switch 58, then the RF switch 30 will block any signal being provided from external source 64 and will pass the signal provided by set-top box 30 to television receiver 32. When the set-top box 30 is providing RF signals for the television receiver 32 through RF switch 58, it also will generate appropriate infrared control signals which are received by the television receiver's remote control infrared detector to enable the television to switch to an appropriate channel to display the RF signals which it (the set-top box 30) generated.

As noted above, the set-top box 30 can also control the television receiver 32 and the VCR, as well as any other external devices 64, by means of an infrared control signal. The infrared control signal is provided by an infrared output terminal ("IR output") 60. IR output 60 produces infrared signals at a range of frequencies, duty cycles and bit-cell times, based on commands from CPU 36, to emulate most commercially available consumer remote controls, as described below.

In one embodiment, the system 5 operates as follows: Throughout the day and night, the information transmission subsystem 6 transmits, and the RF receiver 34 of set-top box 30 receives updated scheduling, miscellaneous and system information and stores it in the memory 38. While television 32 is on, the user may issue commands directly to set-top box 30 using user control device 50. Certain commands will cause set-top box 30 to, through the RF switch, display scheduling and miscellaneous information on television receiver 32. While scheduling and miscellaneous information is being displayed on television 32, signals and programming from external device 64 are blocked by RF switch 58. When scheduling and system information is being displayed on television 32, the set-top box 30 is said to be in "Display Mode." Using user control device 50, the user may select certain scheduling and system information being displayed on television 32. Based on the user's selections, set-top box 30, by means of IR output 60, may send channel tuning or program playback or recording commands to television 32 or external device 64 or store such commands in the memory 38 and send them at a later time. In an alternate "TV mode," the user may view broadcast or recorded programming on his television using the user control device 50 to control the external device 64 supplying such programming.

C. RF Receiver 34, Data Deserialization.

FIG. 4 depicts a functional block diagram of an RF receiver 34 useful in the set-top box 30. As noted above, the RF receiver 34 receives the scheduling, miscellaneous and system information broadcast by the information transmission subsystem 6. With reference to FIG. 4, in one embodiment the RF receiver 34 includes a tunable RF receiver 70 which is tunable within a range of approximately two MHz around 931 MHz. This frequency range was chosen because it corresponds with the frequency used by national and local pager networks. Tunable RF receiver 70 is also connected to a received signal strength indicator ("RSSI") 80, which is connected to CPU 36. RSSI 80 determines the relative strength of the signal being received by tunable RF receiver 70 and provides this data to CPU 36. This relative signal strength data enables CPU 36 to assist the user with the placement of set-top box 30 during installation, to enable the user to locate the set-top box 30 in a location at which it can receive a signal from information transmission subsystem 6 of a suitable signal strength, as described below.

Tunable RF receiver 70 is also connected to a demodulator 72, which converts the analog signal received by tunable RF receiver 70 into either an unclocked two or four-level analog signal, depending on the paging protocol being used by the system. In one embodiment, in which the information transmission subsystem 6 may broadcast information in either the POC SAG or the FLEX transmission protocol, the demodulator 72 initially attempts to decode the information on the assumption that the information transmission subsystem 6 had used the POCSAG protocol. If the demodulator 72 determines that it is unable to identify suitable codewords in the broadcast infomration, it attempts to decode the information on the assumption that the information transmission subsystem 6 had used the FLEX protocol, by searching the information for possible good FLEX packets. When the demodulator 72 identifies the appropriate protocol, it generates an analog signal in response to the receives signal which it provides to a data deserialization module 74, which, in turn, converts the analog signal into a digital signal and provides this digital signal to CPU 36.

Figure 5A:
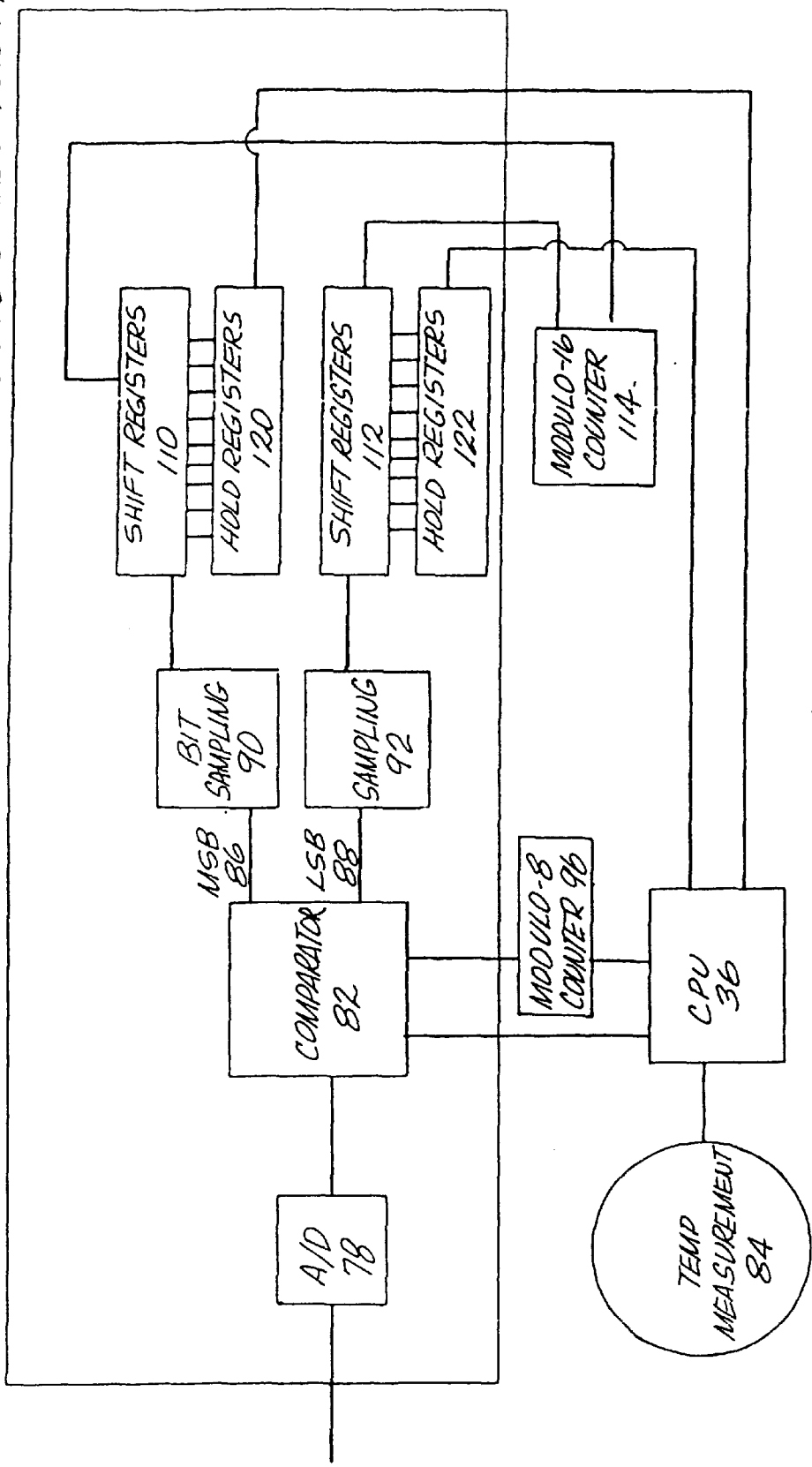
FIG. 5a is a block circuit diagram of the data deserialization module 74 shown in FIG. 4.

It will be appreciated that the data in the information broadcasts received by the set-top box are generally in serial form, and the data deserialization module 74 deserializes the data to form word-parallel data. As shown in FIG. 5*a*, data deserialization module 74 includes an analog-to-digital converter ("A/D converter") 78, which receives analog signals from demodulator 72 and converts them to digital signals at conventional TTL (transistor-transistor logic) voltage levels. A/D converter 78 then supplies these digital signals to comparator 82. Comparator 82 compares each digital signal to one or more threshold values and produces one or more digital output signals based on the results of such comparison. In the preferred embodiment shown in FIG. 5*a*, comparator 82 compares the input signal with three threshold values (designated Thresholds 1, 2 and 3) to generate two output voltages (designated MSB 86 and LSB 88) in accordance with the following table:

| Input Compared To Threshold | | | Output Is | |
| --- | --- | --- | --- | --- |
| 1 | 2 | 3 | MSB | LSB |
| Greater | Greater | Greater | 1 | 0 |
| Greater | Greater | Less | 1 | 1 |
| Greater | Less | Less | 0 | 1 |
| Less | Less | Less | 0 | 0 |

The threshold voltages of comparator 82 are set by CPU 36 during set-up by measuring input values while the received signal strength is high and gathering statistics on the digital values that are generated. The threshold voltages may be adjusted by CPU 36 based on changes in the statistics due to temperature or other environmental change which allows the module 74 to compensate for voltage drift of the demodulator 72 due to such changes.

In an alternate embodiment of the data deserialization device 74, which is shown in FIG. 5*b*, comparator 82 compares the signal with only one threshold value to generate a one-bit output signal. This embodiment may be useful primarily in connection with, for example, the Motorola FLEX protocol. The use of one threshold instead of three provides a wider voltage gap between different signal levels and thus provides greater noise immunity than a three-threshold embodiment. However, less information is conveyed in the same time period by a signal having two rather than four possible values.

Referring again to the embodiment depicted in FIG. 5*a*, to eliminate certain noise-related errors, comparator 82 compares its input signal with the threshold voltage(s) multiple times during a "bit cell period." A "bit cell period" is a time window in which one unit of scheduling and system information (comprising, depending on the number of voltage thresholds used by comparator 82, one or two bits of information) is broadcast by the information transmission subsystem 6. In one embodiment, comparator 82 makes eight voltage comparisons during each bit cell period. Because the analog signals received by RF receiver 34 contain no embedded clocking information, CPU 36 must also ensure that the phase of the input signals corresponds to the bit cell period of comparator 72. The time interval between comparisons is controlled by clocking signals from a modulo-8 counter 96 which is connected to comparator 82 and CPU 36. For example, in FIG. 7*a*, an input signal is shown in which the comparisons are in phase with the input signal, that is, the comparator performs all of the comparions while the input signal represents a single data bit. In that case, the comparator 72 is in phase with the input signal. On the other hand, in FIG. 7*b*, an input signal is shown in which the data bit transitions during the bit cell period; that is, the first three comparisons (0, 1 and 2) are for data bit having a low value, and the last five comparisons (3 through 7) ar for a data bit having a high value. The system 5 attempts to prevent the situation illustrated by FIG. 7*b* from occurring during information broadcast by including in the broadcast signals, at the beginning and end of each of a series of data segments, a pre-defined sequence of data bits, such as signals representing a series of binary "zeroes" followied by signals representing a series of binary "ones" which the CPU 36 may use to ensure that its bit cell period is in phase with the transmitted data. If CPU 36 detects a transition in the middle of a bit cell period, as shown in FIG. 7*b*, it will increment the modulo-8 counter 96, effectively shifting the sample window of FIG. 7*b* to the left by one increment. This process is repeated until the bit cell period roughly corresponds to the beginning and end of the information segments that are being received.

Figure 8:
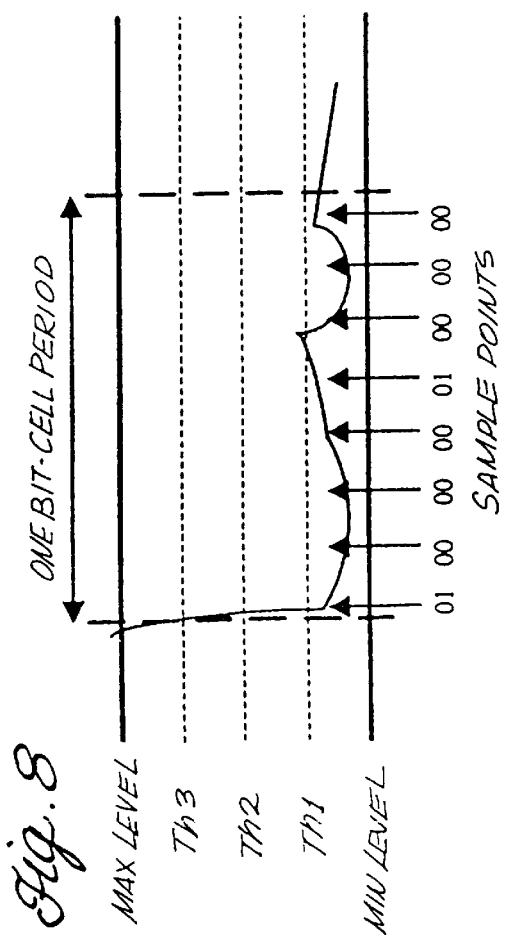

During normal operation, after the CPU 36 has brought comparator 82 into phase with the bit cell period of the received signal, radio transmission noise could interfere with the accurate interpretation of the scheduling, miscellaneous and system information. As shown in FIG. 8, which illustrates noise in a received signal, six of the eight comparisons made by comparator 82 during the shown bit cell period result in an output (the MSB-LSB combination) of "00", while two comparisons result in an output of "01." To determine which of these results should be passed to the next stage of data interpretation, bit sampling modules 90 and 92 are used. Bit sampling module 90 receives MSB 86 as an input, while bit sampling module 92 receives LSB 88 as an input.

The bit sampling modules 90 and 92 determine values for the most and least significant bits, respectively, based on the number of comparisons by the comparator 82 during a bit cell period giving rise to each bit value. That is, if comparisons generated by the comparator 82 during a bit cell period identify zero through three comparisons for the most significant bit indicating the value "one," the bit sampling module 90 will identify the value "zero" for the most significant bit. On the other hand, if four through seven comparisons for the most significant bit indicate the value "one," the bit sampling module 90 will identify the value "one" for the most significant bit. The bit sampling module 92 operates similarly in connection with the least significant bit.

More particularly, the logical operation of bit sampling module 90 is illustrated in FIG. 6. Bit sampling module 92 operates in an analogous manner and will not be described in detail. The most significant bit signal from comparator 82 is coupled over line 86 to 3-bit counter 100. Each time the most significant bit signal identifies a "one," counter 100 is incremented by one. A bit counter 108 is incremented each time the comparator 82 provides a new value identification, and so when the value of counter 108 reaches 8 at the end of each bit cell period it generates a reset signal to reset the counter 100. At the end of each bit cell period, prior to the reset of counter 100, a gate array 102 evaluates the status of counter 100. If the value of counter 100 is 000, 001, 010 or 011 (0, 1, 2 or 3), then the value of the most signficant bit, as coupled by gate array 102 over output 104, will be "zero." On the other hand, if the value of counter 100 is 100, 101, 110 or 111 (4, 5, 6 or 7), the value of the most significant bit will be "one."

In addition, the bit sampling module 90 generates a value identifying the "quality" of the bit sample, in relation to how close the final value of counter 100 corresponds to the "ideal" or "no noise" value of 0 or 7. In one embodiment, gate array 102 accomplishes this by comparing the first two bits of counter 100. If the two bits are different (representing a "noisy" value of 2, 3, 4 or 5), then the gate array 102 sets an "alert" flag 106, which flag may be accessed by other portions of the system. If the two bits are identical (representing a "clean" value of 0, 1, 6 or 7), then the "alert" flag 106 is reset to 0. Alert flag 106 is the output of a D flipflop 109, the data input of which is connected to the output of gate array 102, and the clear input of which is connected to counter 108.

Thus, in the example shown in FIG. 8, bit sampling module 90 will count 8 zeros and no ones for the most significant bit for the bit cell period, resulting in a zero output for the most significant bit; and bit sampling module 92 will count 6 zeros and 2 ones, resulting in a zero output for the least significant bit. Because counter 100 of each bit sampling module 90 was not 2, 3, 4 or 5, the alert flag 106 was not set for either bit, indicating a relatively noise free bit.

Referring again to FIG. 5a, at the end of each bit cell period, the outputs of bit sampling modules 90 and 92 are each shifted into a respective 16-bit shift register 110 and 112. After 16 such shifts, a modulo-16 counter 114 resets and causes the contents of shift registers 110, 112 to be shifted into respective 16-bit hold registers 120 and 122. This shift causes an interrupt signal to be sent to CPU 36, which enables the CPU 36 to read the data in the hold registers 120 and 122. In an alternative embodiment of the invention, modulo16 counter 114 may be incremented by CPU 36 to cause the phase of the sample period to correspond with the phase of the input data as discussed above with respect to FIGS. 7a and 7b.

D. Video Generation

The set-top box 30 stores video image data used to define the video image that is transmitted to television receiver 32 in its memory 38. The video image data is retrieved from the memory 38 in a conventional manner for use in generating the RF signal coupled to the RF switch 58.

E. Data Processing.

System Control Flow.

Figure 9:
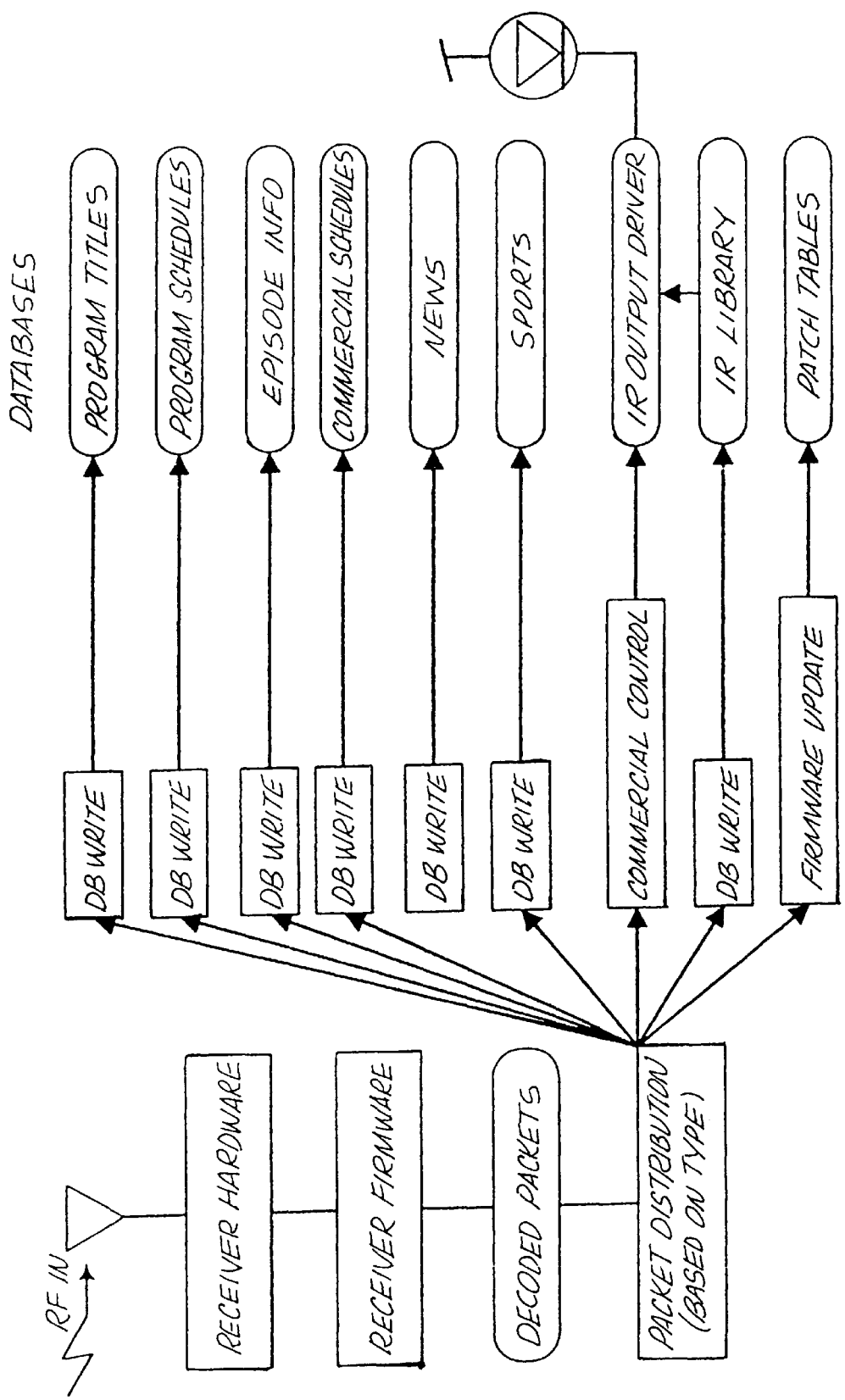
FIG. 9 is a flow chart of the operation of the CPU of the present invention which provides task scheduling and communications facilities for the system.

As illustrated by FIG. 9, the CPU 36 runs under the control of a commercially available real-time operating kernel (in one embodiment, the Nucleus Plus kernel from Accelerated Technologies) which provides task scheduling and communications facilities for the system. Information received from the RF input 34 as described above is sent in software queues to waiting destination processes, while IR commands from the user control device 50 are processed by an interrupt-based driver and passed to a global event queue to be received by the currently activated application. In addition, some processes, such as those controlling VCR recording, are suspended until scheduled events, such as times to start or stop a VCR, occur.

Data De-Interleave.

Data transmitted to the system in the Motorola FLEX paging format is 8-way interleaved for additional noise immunity as follows:

| Reg | D1 | D6 | DS | D4 | D3 | D2 | D1 | D0 |
|-----|----|----|----|----|----|----|----|----|
| 0 | A0 | B0 | C0 | D0 | E0 | F0 | G0 | H0 |
| 1 | A1 | B1 | C1 | D1 | E1 | F1 | G1 | H1 |
| 2 | A2 | B2 | C2 | D2 | E2 | F2 | G2 | H2 |
| 3 | A3 | B3 | C3 | D3 | E3 | F3 | G3 | H3 |
| 4 | A4 | B4 | C4 | D4 | E4 | F4 | G4 | H4 |
| 5 | A5 | B5 | C5 | D5 | E5 | F5 | G5 | H5 |
| 6 | A6 | B6 | C6 | D6 | E6 | F6 | G6 | H6 |
| 7 | A7 | B7 | C7 | D7 | E7 | F7 | G7 | H7 |

Data is received down the columns of the above table beginning with bit A0, followed by B0, C0, . . . , H0, A1, . . . , H31. To de-interleave the data, the CPU 73 has a set of eight registers which "rotate" their bits ninety degrees. That is, data is loaded into these registers as follows:

| Reg | data7 | data6 | data5 | data4 | data3 | data2 | data1 | data0 |
|-----|-------|-------|-------|-------|-------|-------|-------|-------|
| 0 | A0 | A1 | A2 | A3 | A4 | A5 | A6 | A7 |
| 1 | B0 | B1 | B2 | B3 | B4 | B5 | B6 | B7 |
| 2 | C0 | C1 | C2 | C3 | C4 | C5 | C6 | C7 |
| 3 | D0 | D1 | D2 | D3 | D4 | D5 | D6 | D7 |
| 4 | E0 | E1 | E2 | E3 | E4 | E5 | E6 | E7 |
| 5 | F0 | F1 | F2 | F3 | F4 | F5 | F6 | F7 |
| 6 | G0 | G1 | G2 | G3 | G4 | G5 | G6 | G7 |
| 7 | H0 | H1 | H2 | H3 | H4 | H5 | H6 | H7 |

Upon reading by the CPU 36, the data is rotated so that it appears as follows: Word Bit

| Word | Bit | | | | | | | | | | | | | | | | | | |
|---|---|---|---|---|---|---|---|---|---|---|---|---|---|---|---|---|---|---|---|
| A | 0 | 1 | 2 | 3 | 4 | 5 | 6 | 7 | 8 | 9 | 10 | 11 | 12 | 13 | 14 | 15 | 16 | 17 | ... 31 |
| B | 0 | 1 | 2 | 3 | 4 | 5 | 6 | 7 | 8 | 9 | 10 | 11 | 12 | 13 | 14 | 15 | 16 | 17 | ... 31 |
| C | 0 | 1 | 2 | 3 | 4 | 5 | 6 | 7 | 8 | 9 | 10 | 11 | 12 | 13 | 14 | 15 | 16 | 17 | ... 31 |
| D | 0 | 1 | 2 | 3 | 4 | 5 | 6 | 7 | 8 | 9 | 10 | 11 | 12 | 13 | 14 | 15 | 16 | 17 | ... 31 |
| E | 0 | 1 | 2 | 3 | 4 | 5 | 6 | 7 | 8 | 9 | 10 | 11 | 12 | 13 | 14 | 15 | 16 | 17 | ... 31 |
| F | 0 | 1 | 2 | 3 | 4 | 5 | 6 | 7 | 8 | 9 | 10 | 11 | 12 | 13 | 14 | 15 | 16 | 17 | ... 31 |
| G | 0 | 1 | 2 | 3 | 4 | 5 | 6 | 7 | 8 | 9 | 10 | 11 | 12 | 13 | 14 | 15 | 16 | 17 | ... 31 |
| H | 0 | 1 | 2 | 3 | 4 | 5 | 6 | 7 | 8 | 9 | 10 | 11 | 12 | 13 | 14 | 15 | 16 | 17 | ... 31 |

Because the CPU 36 addresses the registers and memory 38 on a byte-by-byte basis, only one byte at a time needs to be rotated using the above method, although a full 256 bits (corresponding to eight 32-bit words) must be read before all eight words can be assembled.

Database Storage.

Figure 10:
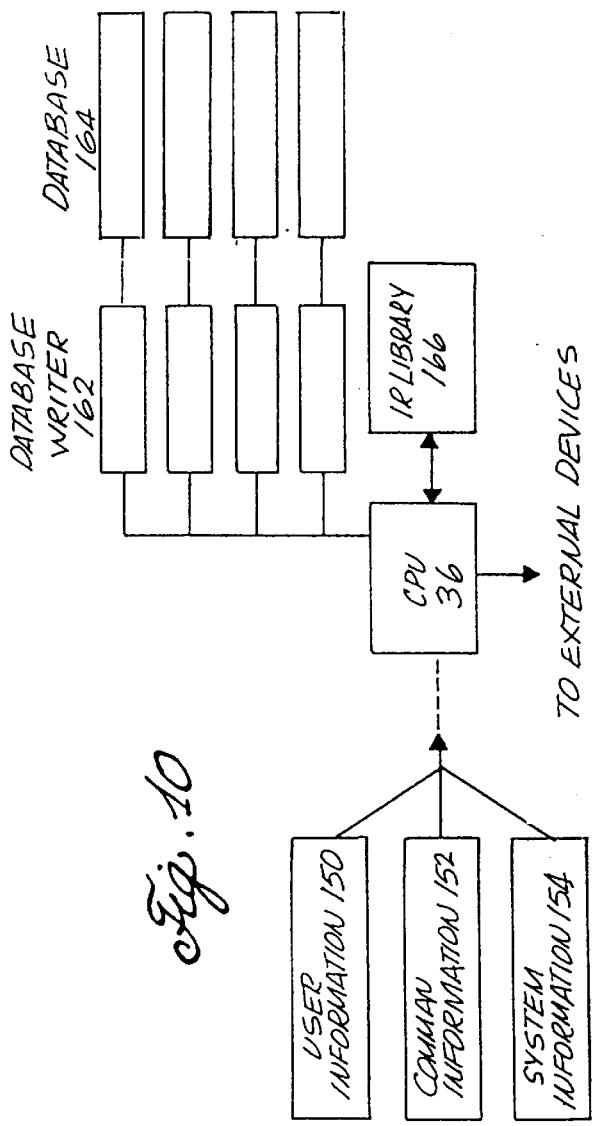
FIG. 10 is a functional diagram of the information processed by the system of the present invention.

As illustrated by FIG. 10, there are three classes of scheduling, miscellaneous and system information received by the CPU 36, namely User Information 150, Command Information 152 and System Information 154. As illustrated by FIG. 11, the scheduling, miscellaneous and system information received by the set-top box 30 comprises a series of individual segments, with the each segment being associated with classification bits 174 which identify the segment's class.

"User information" includes scheduling and miscellaneous information, including program title information, program schedule information, and episode description information, as well as textual information such as news, weather, sports and information related to other subjects, each of which is associated with one of a plurality of sub-classes. Upon recognition by the CPU 36, User information is sent by the CPU 36 to one of a plurality of database writers 162 which corresponds to the sub-class. The database writer 162 then writes the scheduling and system information to memory 38 in an appropriate database 164, from which it may be recalled and displayed at a later time.

"Command Information" includes information which causes the IR output 60 to issue specific commands to external devices, such as the television receiver 32 or a VCR, such as commands to avoid real-time commercial broadcasts as discussed below. The CPU 36 receives Control Commands in a generic format, and then retrieves corresponding IR control codes and sequences corresponding to the user's external device from an IR Library 166, which holds the specifications for the user's particular device configuration. Control Commands may originate either from the user control device 50 or from broadcasts received by the RF receiver 34.

"System Information" includes command information which automatically alters the CPU's programming to initiate software bug fixes and add new services or databases without the interaction of the user. System Information will typically originate at the information transmission subsystem 6.

Database Output.

The arrangement by which the set-top box 30 retrieves information from the databases will be illustrated by the example of FIG. 12, in which a user, through the user control device 50, has elected to view news information. When a user chooses "news" from a screen display on which news is an option, a program called the news display application 182 is called by the operating kernel 180. The news display application 182 downloads data from the news database 184 and, based on the user's commands, downloads this data to a memory display list 186. The memory display list 186 sends the data to video hardware 188, which generates an RF output to transmit the data in video form through RF switch 58 for display on the television 32.

Automatic Display ordering.

The set-top box 30 can enable the program schedule information to be displayed by the television receiver 32 with an alphanumeric ordering that is based on channel number or name, or with an based on the user's viewing habits. With reference to FIG. 13, to allow the channel ordering to be based on the user's viewing habits, the set-top box 30 maintains a running record of the amount of time the user views the various channels over a selected period of time, and orders the channels based on a viewing time rating that is a function of actual viewing time over a current viewing period, for example, the previous day or week, and further based a decaying function of viewing time for viewing periods before the current viewing period. The set-top box 30 also can enable the ordering of other types of information, such as news information, that it enables the television receiver 32 displays based on the user's viewing habits. In that operation, each item of news information is associated with one of a number of categories, and the set-top box 30 keeps track of the classes of news information viewed by the user. In addition, the set-top box 30 will order the items of news information based on the ages of the items and a priority value that is assigned by system 5.

Automatic Memory Recovery.

Figure 14:
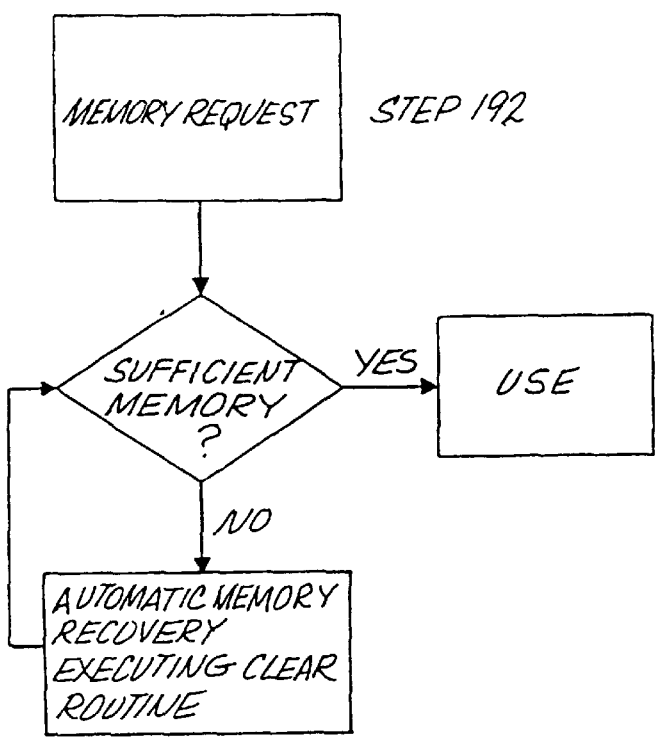
FIG. 14 is a flow chart showing the steps associated with a memory request made by the system and process of the present invention.

Because the information in the set-top box's databases is continuously updated, the set-top box 30 includes an arrangement for deleting old items and otherwise recovering database storage space. Any of a number of conventional memory recovery methodologies may be used to select existing memory space to be over-written by new data. As illustrated by the flow chart of FIG. 14, when an application or database management tool requires memory to store scheduling and system information, the kernel initiates a "memory request" in step 192. If sufficient free memory is not available, each application is then called with an "automatic memory recovery" request to free low-priority memory items. In one particular embodiment, memory recovery is accomplished in three ways:

(1) Certain database items are tagged with a specific "data type identifier," (or "slot identifier") which allows future items having the same data type identifier to simply replace them, recovering the memory occupied by the original. This may be used, for example, to allow a particular news story to be updated with new information by replacing the outdated information.

(2) Most database items include aging information, such as information as to when they were added to the database, so that they may be deleted a certain period of time after they have been added to the database. For example, portions of memory in which miscellaneous information, such as news, weather, and sports information, is stored may be used for new information after a selected period of time, and portions in which television program schedule information is stored may be used for new information after the program transmission time has passed.

(3) Portions of memory in which database items which have low ratings under the display ordering system may be used for new information a short time after they were loaded into memory. If a user rarely or never accesses certain types of miscellaneous information, portions of memory in which those types of information are store may be re-used before it has aged greatly. If a user rarely or never watches a particular channel, or if the user seldom watches television during a particular time period (such as early morning, midday, etc.) the schedule application may delete the "scheduling information" relevant to that channel or time period when additional memory is needed. In an alternative embodiment, an item's display ordering rating is considered in combination with its age to determine whether the portions of memory in which that item is stored should be re-used.

F. System Setup.

Figure 15:
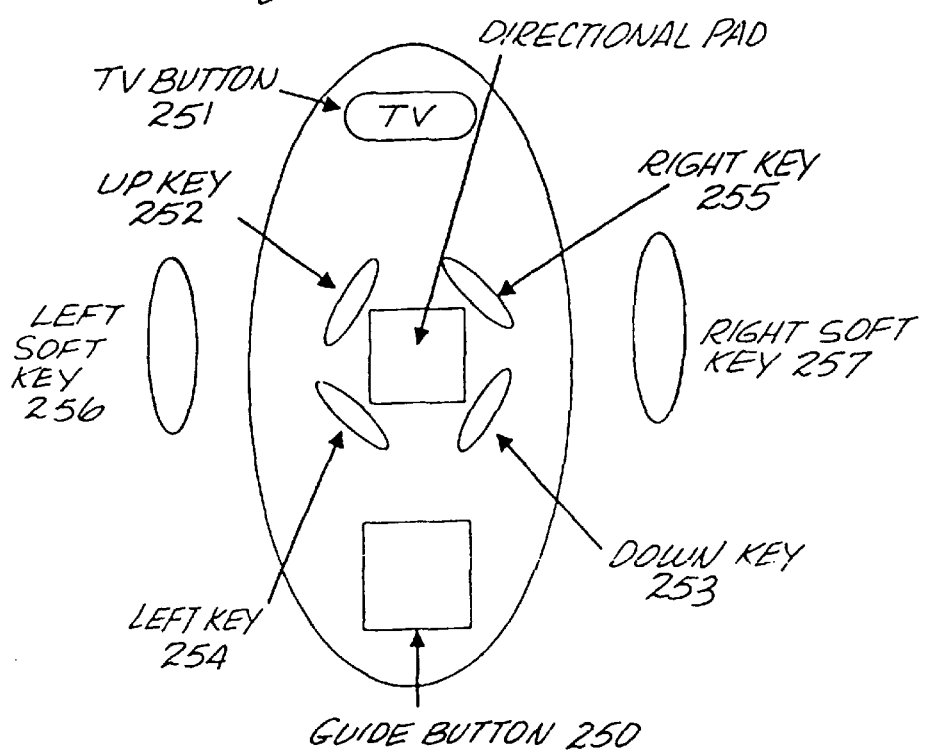
FIG. 15 is a block diagram of the portions of the system that are utilized in the initial set up procedure of the system and process of the present invention.
Figure 17:
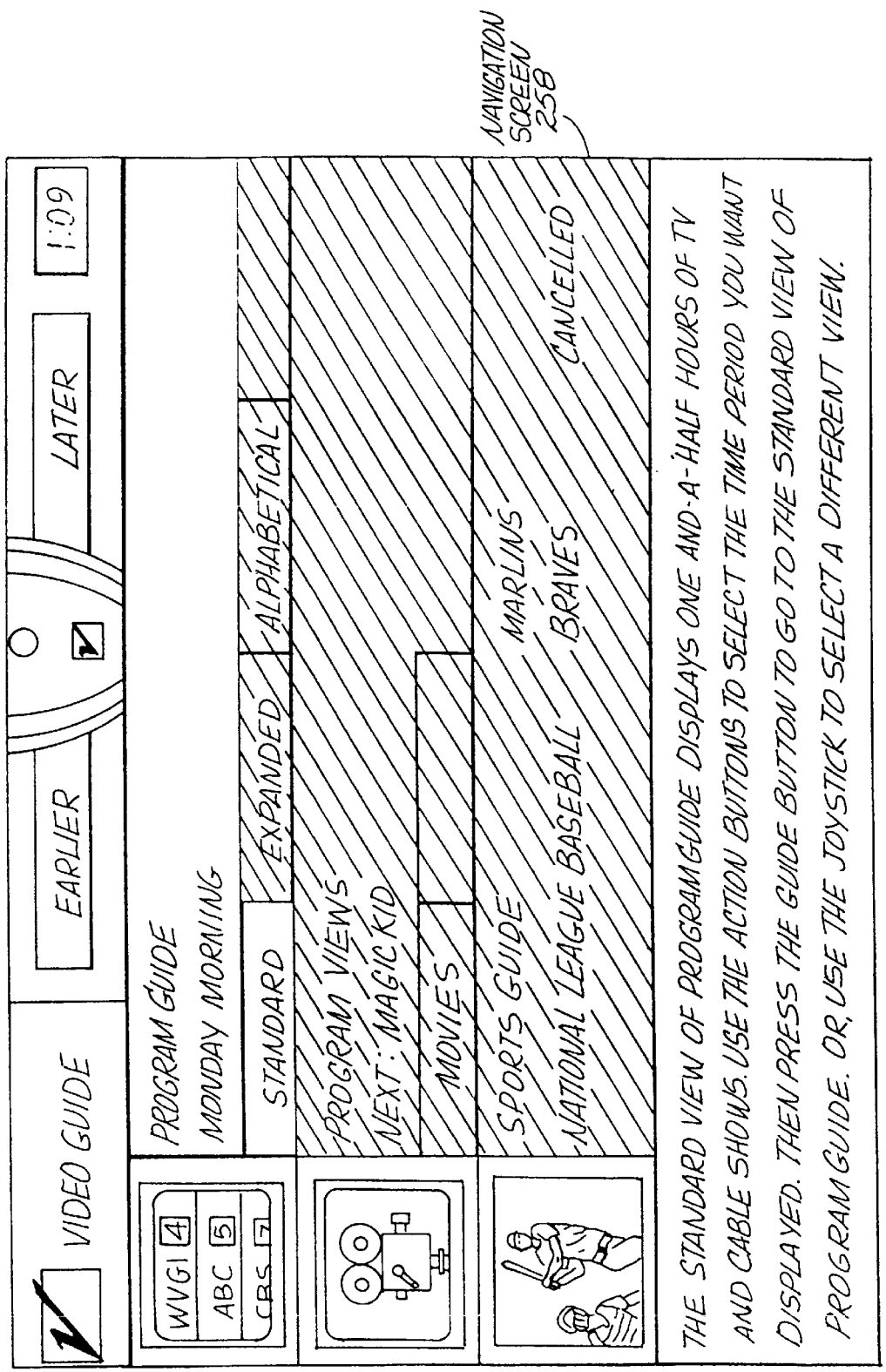
FIG. 17 is a flowchart of the steps that the system performs for emulating infrared input signals for a user's television.

The system setup procedure for the system is illustrated in connection with FIG. 15 and the flowchart depicted in FIG. 16. First, the user will typically connect the power cord 202 of the set-top box 32 to an AC power outlet, and thereafter connect the two input leads 212 of RF switch 58 to the set-top box's video output terminal 208 and the television receiver 32.

Next, and with reference to the flow chart of FIG. 16, after the user tunes the television receiver 32 to a designated available unused channel (typically channel 3 or channel 4) in step 218, the system generated a video output signal that is coupled through RF switch 58 to enables the television receiver 32 to display an initial set up screen (step 220). The set-top box 30 will prompt the user to enter his or her local zip code using the UP/DOWN keys of the user control device 50 (Step 222). The ROM 42 contains a list of zip code areas for which multiple cable providers are available and in step 222 the system compares the user's zip code to see if it is present in the list. If the user's zip code is in the list, the set-up box 30, in step 226, asks the user which, if any, cable provider is used. In step 228 the set-up box 30 receives the user's response, which may be the selection of the correct choice from a displayed list of cable providers for the user's area using the user control device 50.

Thereafter, the user and set-top box 30 cooperate to "teach" the set-top box 30 to emulate the infrared input signals for the user's television, VCR, cable decoder box, if any, and any other external devices to be controlled by the set-top box 30. In step 230, the set-top box 30, enables the television receiver 30 to display an instruction to the user to place his television remote control near the infrared input of the set-top box and press one or more specified keys on the television remote control, in one particular embodiment the "Volume Down" key. In step 232, the IR input feeds the signal to the CPU 36 which records the frequency, duty cycle and other information about the signal. The CPU 36 then compares this information in step 234 with a library of television remote control information maintained in ROM42. If a match is made, the CPU 36 records the type of television receiver 32 and information about the television remote control, incluidng the specific IR command frequencies, duty cycles and bit patterns for such type of television in the EEPROM. If no match is made, the user may explicitly teach the set-top box 30 the infrared signal pattern for each key on the television receiver 32, by depressing keys on the television remote control in response to on-screene prompts provided by the set-top box.

Thereafter (until the setup procedure is repeated), any commands issued by the IR output of the set-top box 30 will conform to the specifications. The same procedure is followed for the "Channel Down" command of the cable decoder, if any, and the stop command of the VCR, if any. Once this setup procedure is completed, the system is able, by emulating the specified types of remote controls, to control the television, VCK and cable decoder through its single IR output.

Signal strength detection: During the system set-up operations as described above, the set-top box also contemporaneously receives the RF signals from the paging terminal 18 and generate signal strength statistics from the relative signal strength indicator 80 (FIG. 4). If the high end of the RSSI range is relatively low, and error rates are high, the set-top box 30 generates a video output signal, which it transmits through RF switch 58 for display by the television receiver 32 to notify the user that the set-top box should be repositioned.

Following the initial setup, the system automatically begins to receive scheduling and system information over its RF receiver, including the proper time and Date (for setting of the system clock).

G. User Interface.

i. IR Remote.

Operation.

According to commands issued by the CPU 36, the IR decoder will interpret infrared control signals supplied by the user control device 50 in one of two modes: "raw" or "demodulated." The "raw" mode is used during the system set-up as described above. In "demodulated" mode, the IR decoder will generate a continuous digital "1" output to the CPU when certain infrared control signals are detected and will otherwise generate a digital "0" output. Demodulated mode is used to enable the user to select a highlighted tile from various display screens using the user control device 50 and to provide the set-top box 30 with other commands.

In "raw" mode, the IR detector generates a time stamp for each infrared input it receives, and records data such as the IR carrier frequency, duty cycle and encoding method of such input.

In one embodiment, the user control device 50 a carrier frequency of approximately 80 Khz, which will insulate the IR detector from stray signals generated by other consumer electronic devices, most of which transmit at carrier frequencies in the 40–50 KHz range, and will also ensure that the user control device 50 will not interfere with the operation of other consumer devices having infrared inputs, particularly the television and external devices which may be part of the video system.

Layout.

As shown in FIG. 18, the IR remote of the preferred embodiment contains 8 keys designated as follows:

GUIDE key 250

TV key 251

UP key 252

DOWN key 253 ("Directional Pad" buttons)

LEFT key 254

RIGHT key 255
LEFT SOFTKEY 256
RIGHT SOFTKEY 257
Universal Remote Usage.

When the system is in TV mode, the Directional Pad buttons and the softkeys function to control the television and external devices. In that mode, the up and down keys 252 and 253 are used to increment and decrement the channels, respectively, the right and left keys 255 and 254 are used to increase and decrease volume, the left softkey 256 is used to turn power on and off, and the right softkey 257 is used to control device muting.

II. Screen Displays.

1. Basic Screen Display Features.

Figure 19:
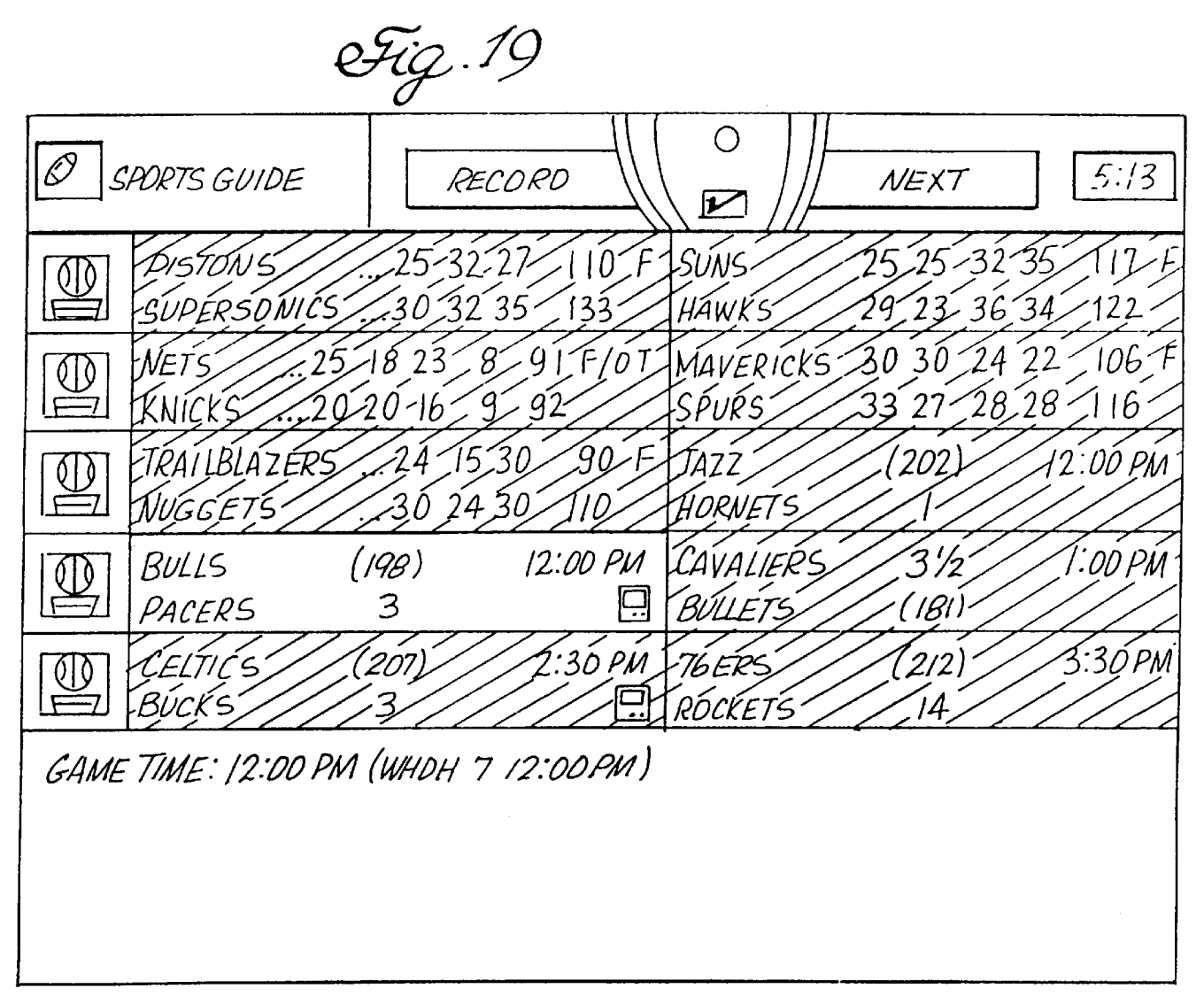

The set-top box can present a variety of screen displays on the television. As descried above, the screen displays are provided by the set-top box 30 by means of an RF signal coupled through the RF switch 58, and when the set-top box provides such a screen display, it enables the television receiver 32 to switch to the selected channel (such as channel 3 or 4) for screen display by providing an appropriate infrared signal to the television receiver's infrared remote control input. As illustrated in FIG. 19, every screen display has a common Banner Area 240 which describes the functions of the softkeys for that screen and lists the title of the screen display. Most screen displays also include a number of boxes enclosing text, each of which is referred to as a "tile" 244, and which collectively form a "grid" 242.

When the user has selected a tile, or moved the cursor onto a tile using the directional keys of the IR remote, the color of the tile will change, and it is said to be "highlighted." In screen displays that include program titles, different types of programming can be represented by tiles of differing colors.

If the highlighted tile is near an edge of the screen display, the screen display will automatically "scroll" to bring the highlighted tile near the center of the screen display. Certain screen displays do not allow the highlighted tile to be at the edge of the display screen unless no information is contained off-screen beyond the edge of the display screen.

All screen displays al so have an information area 246 which displays further information about the selected tile, such as episode information about a select ed program or additional information about a news headline.

Navigation in Screen Displays.

The buttons of the user control device 50 enable the user to access all screen displays and features of the system that may be controlled by users. Pressing the directional buttons 252–255 of the IR remote 50 moves the cursor and highlighted tile up, down, left and right on the grid. Pressing the GUIDE key 250 will select a highlighted tile and switch the system to the next display screen bringing up the Navigation Screen if the user is currently watching television programming). Pressing the TV key 250 will return to television programming from the screen displays, either tuning to a new station if the Program Grid screen display was active immediately prior to pressing TV and the program highlighted on the Program Grid is available, or tuning back to the original station being watched if not. In screen displays that display a grid of television program scheduling information (i.e. Program Grid, Programs by Title, TV Movies and Sports Ticker), LEFT SOFTKEY 256 will cause the highlighted program to be recorded. A summary of the functions available in each display screen is illustrated in Table I below:

| Current Display | GUIDE key fn | TV Key function | LEFT key function | RIGHT key fn | Up/Down key fn | Left/Right Key Fn |
|---|---|---|---|---|---|---|
| Television viewing | Brings up Navigation Screen | Brings up Previous Screen | MUTE television | TV Power On/Off | Channel Up/Down | Volume Up/Down |
| Navigation Screen | Bring up Selected Screen | Return to TV Viewing | various | various | select screen option | choose screen tile |
| Program Grid | Bring up TV Movie Screen | Tune to selected program | Record selected program | Advance display one day | grid select up/down | grid select left/right |
| TV Movie Screen | Bring Up Sports Screen | Tune to selected program | RECORD selected program | unused | grid select up/down | grid select left/right (choose day) |
| Sports Screen | Bring up News Screen | Return to TV Viewing | [record selected game] | unused | grid select up/down | grid select left/right |
| News Screen | Return to TV Viewing | Return to TV Viewing | [previous page of text] | [next page of text] | grid select up/down (Headline) | Text Page Select Fore/Back |

Navigation Screen.

Referring to FIG. 20, the Navigation Screen 258 is the first screen displayed after the user presses the GUIDE button 250 of the user control device 50. The Navigation Screen lists the major screens that are available in one embodiment, namely, TV program Listings, TV Movies, Sports and News. In addition, certain non-screen features of the system have tiles on the Navigation Screen, including the commercial avoidance feature, as will be described below. The Navigation Screen may also include other information, such as personal messages, reminders or paid advertising.

Program Grid.

Figure 21:
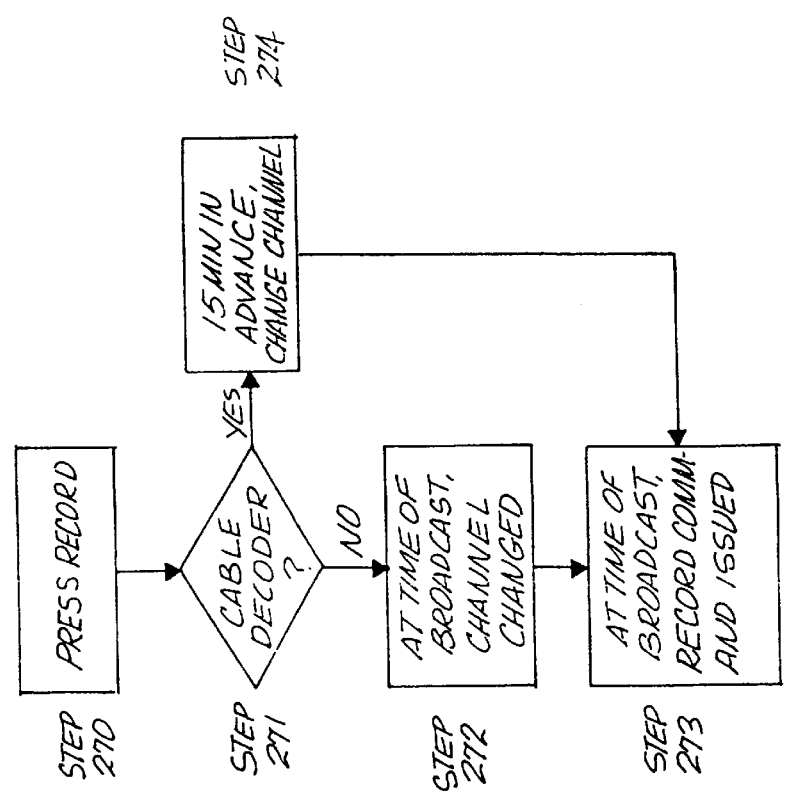
FIG. 21 is a representation of a Program Grid screen generated by the system of the present invention.

In the Program Grid 260, shown in FIG. 21, tiles contain television program titles 262, arranged vertically by broadcaster, such as the station or network, and horizontally by time. The information area 263 displays further episode information about the highlighted tile. The RIGHT SOFT-KEY 257 advances the screen display one day in time.

Sports Ticker.

Figure 22:
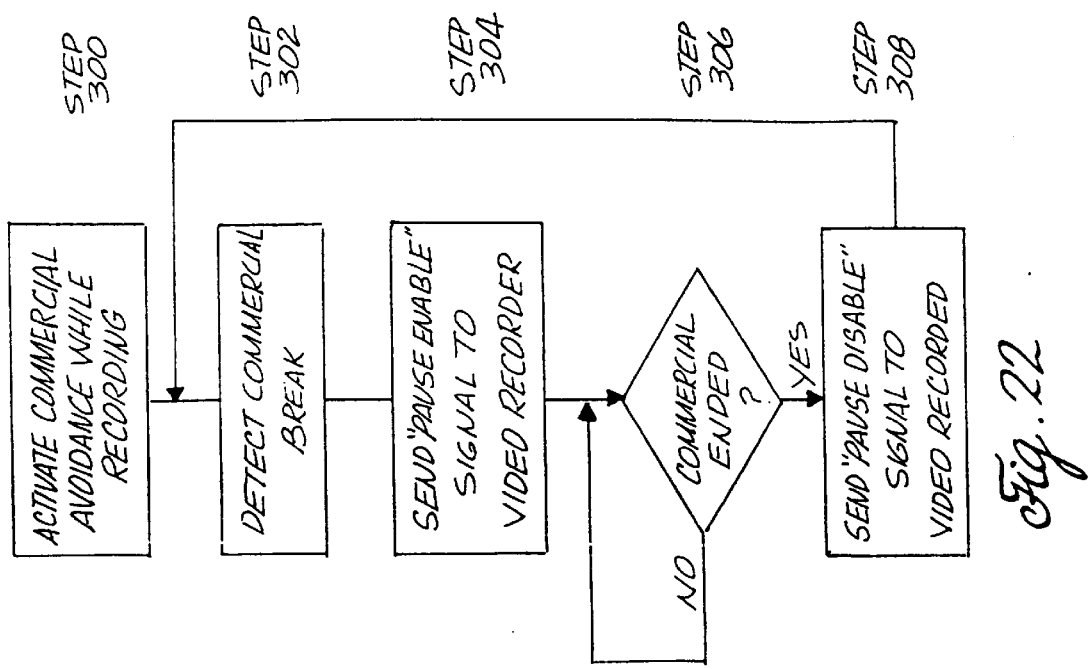
FIG. 22 is a representation of a Sports Ticker screen generated by the system of the present invention.

As shown in FIG. 22, the Sports Ticker display shows information relating to different sporting events and their ongoing scores. When the highlighted tile represents a specific sports event, further information relevant to that event is shown in the Information Area. If events are televised, an icon, which in one embodiment is a small representation of a television receiver, is displayed in the tile. For these televised events, a user can cause the set-top box 30 to enable the television receiver 32 to switch to that program by highlighting and selecting the tile associated with the event in the same manner that he or she can enable the set-top box 30 to select programming through the Program by Title screen.

News.

As shown in FIG. 23 the News display uses a scrolling list of tiles to show brief headlines of news stories. The user may use the user control device 50 to select a tile, and the Information Area shows the full text of the news story associated with the selected tile.

Other Screens.

Other embodiments of the invention may include screen displays with features such as horoscopes, crossword puzzles.

I. Other Features

1. Recording Programs.

Selection of Programs for Recording.

In the display screens including program titles, the user may select a program for recording by highlighting that program's tile and pressing the LEFT SOFTKEY 256. When a program is scheduled to be recorded, the background color of its tile is changed to a selected alternate coloer, which in one embodiment is red. Programs can be scheduled to be recorded at selected intervals, including "once" or "always." When a program is scheduled to be recorded once, the CPU will cause the VCR to record the program at the date and time selected. The user may select recording once by pressing the LEFT SOFTKEY 256 once on a tile. When a program is scheduled to be recorded regularly, the CPU will cause the VCR to record the program each time it occurs in the time slot originally selected by the user. The user may select recording regularly by pressing the LEFT SOFTKEY 256 twice when a tile is highlighted.

Figure 24:
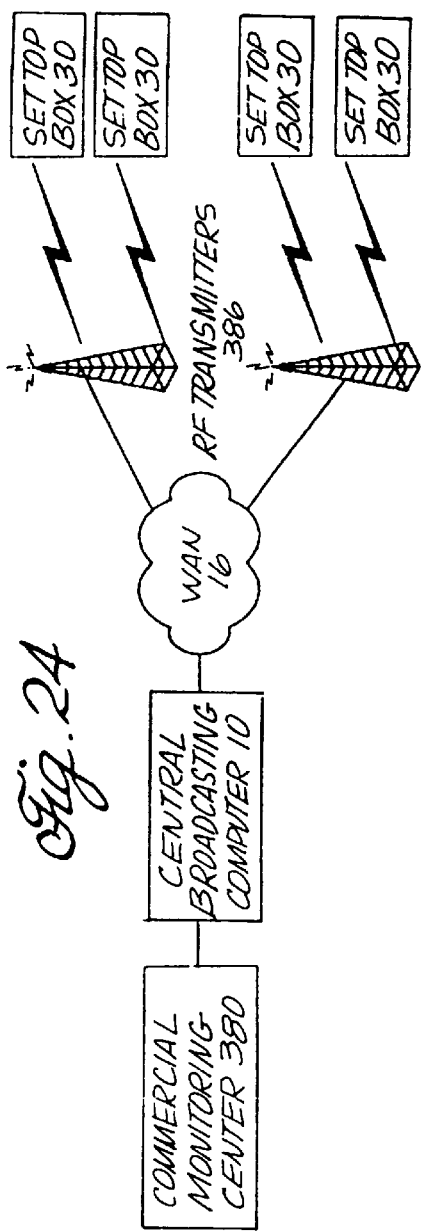
FIG. 24 is a flowchart of the steps of the automatic recording process utilized by the system of the present invention.

As shown in the flow chart of FIG. 24, the automatic recording process varies depending on the particular system configuration. In step 270, the recording process is initiated by pressing the LEFT SOFTKEY 270, and if it is determined in step 271 that the system does not include a cable decoder, as indicated during the set-up procedure described above, at the time of broadcast of a program scheduled to be recorded, the set-top box's IR output 60 will send a channel change in step 272 and a "Record' command to the VCR in step 273, and at the end of the scheduled program, a "Stop' command will be sent to the VCR. If a cable decoder is used in the system, a channel change command will be sent to the cable decoder a selected amount of time in advance of the scheduled recording time in step 274 and a "Record" command will be sent to the VCR by the IR Output 60 in step 273 at the time of scheduled broadcast; a "Stop" command will be sent to the VCR at the scheduled end of the broadcast.

2. Commercial Avoidance.

In one embodiment, the set-top box 30 can enables users in certain areas of the United States to avoid broadcast advertising during the viewing or recording of television programs on certain channels. This feature is selected by the user through a tile on the Navigation Screen. While this tile is selected, moving the directional control up or down chooses between the following options: "Off", "While Viewing", "While Recording", and "While Viewing and Recording". The implementation of each of these options will now be discussed.

Figure 25:
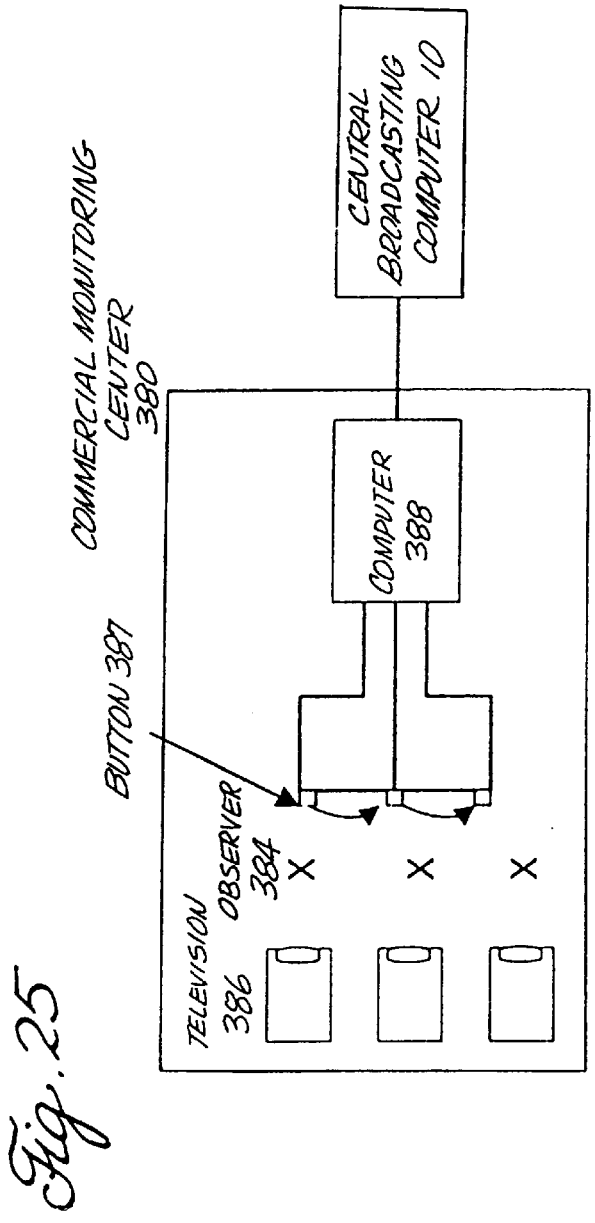
FIG. 25 is a flowchart of the steps utilized by the system of the present invention for implementing the "While recording" commercial avoidance feature.

"While Recording": Referring to FIG. 25, if a program is being recorded when a commercial break occurs as described below, the IR output 60 will send a "pause enable" signal to the video recorder in step 304 and will not send a "pause disable" signal to the video recorder in step 308 until the end of the commercial break is detected in step 306. As a result, the video recorder will not record commercials. This feature saves videotape during the unattended taping of programming.

Figure 26:
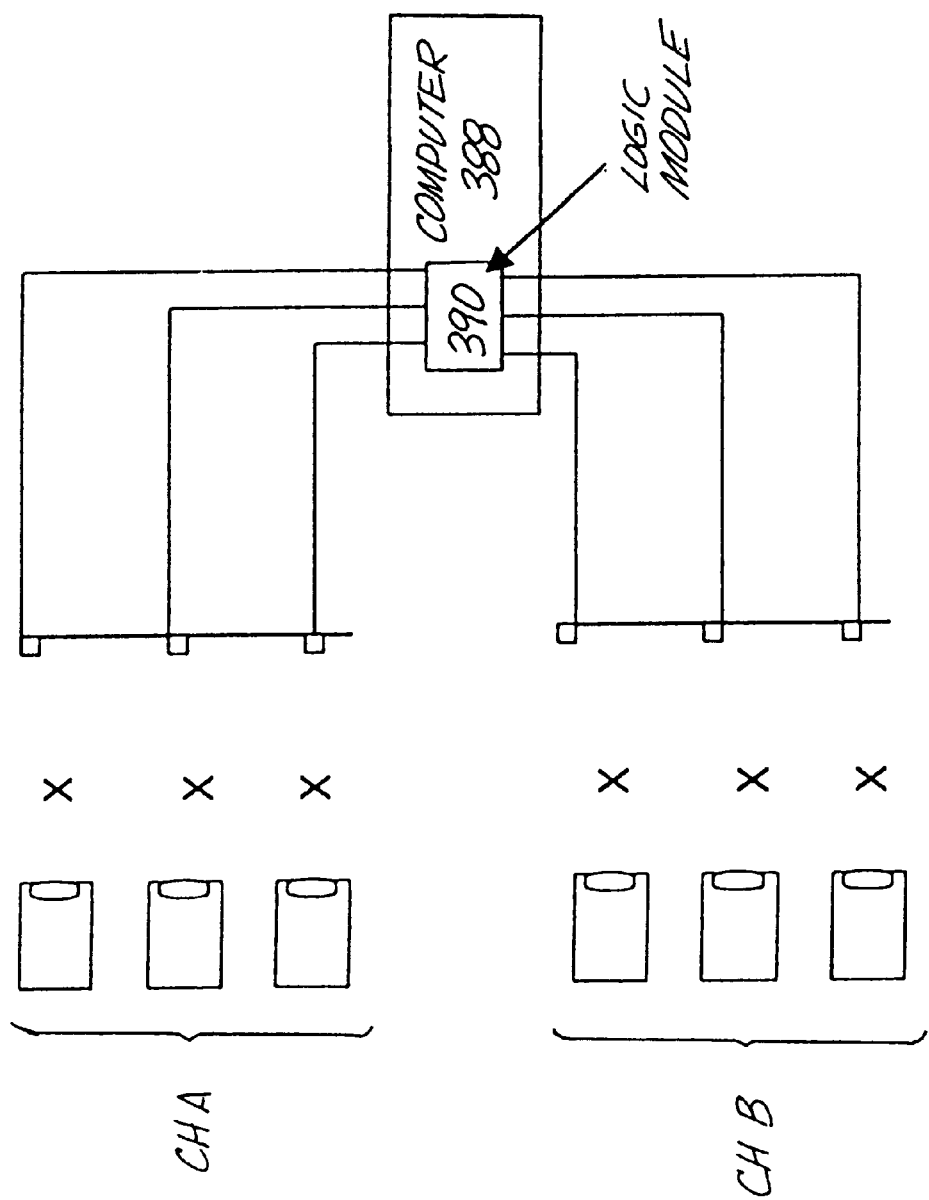
FIG. 26 is a flowchart of the steps utilized by the system of the present invention for implementing the "While Viewing" commercial avoidance feature.

"While Viewing': Referring to FIG. 26, if a user, who has selected this option in step 320, is viewing a channel ("Channel A") when a commercial break occurs as detected in step 322, the IR output 60 of the set-top box 10 will issue a "mute enable" command to television 32 in step 324. The television then substantially diminishes the volume of the television for the duration of the commercial break in step 326, and will not issue a "mute disable" command to the television 32 in step 330, to restore the volume in step 332, until the commercial break is over in step 328. If the system detects in step 334 that the user has changed the channel (to "Channel B") using the user control device 50 after the "mute enable" command is issued, the IR output 60 will automatically issue a "mute disable" command in step 336, restoring sound for viewing of Channel B in step 338. In addition, when the end of the commercial break on Channel A is detected in step 340, the IR output 60 will automatically issue a command in step 342 to the television or cable decoder to tune back to Channel A in step 344. Then, in step 346, Channel B will be stored in a memory means as an "alternate channel" to be switched to during commercial breaks on Channel A. Upon the occurrence of the next commercial break on Channel A, the system will automatically tune the television to Channel B for the duration of the commercial break. Channel B may also be a display screen (such as Sports Ticker or News).

Figure 27:
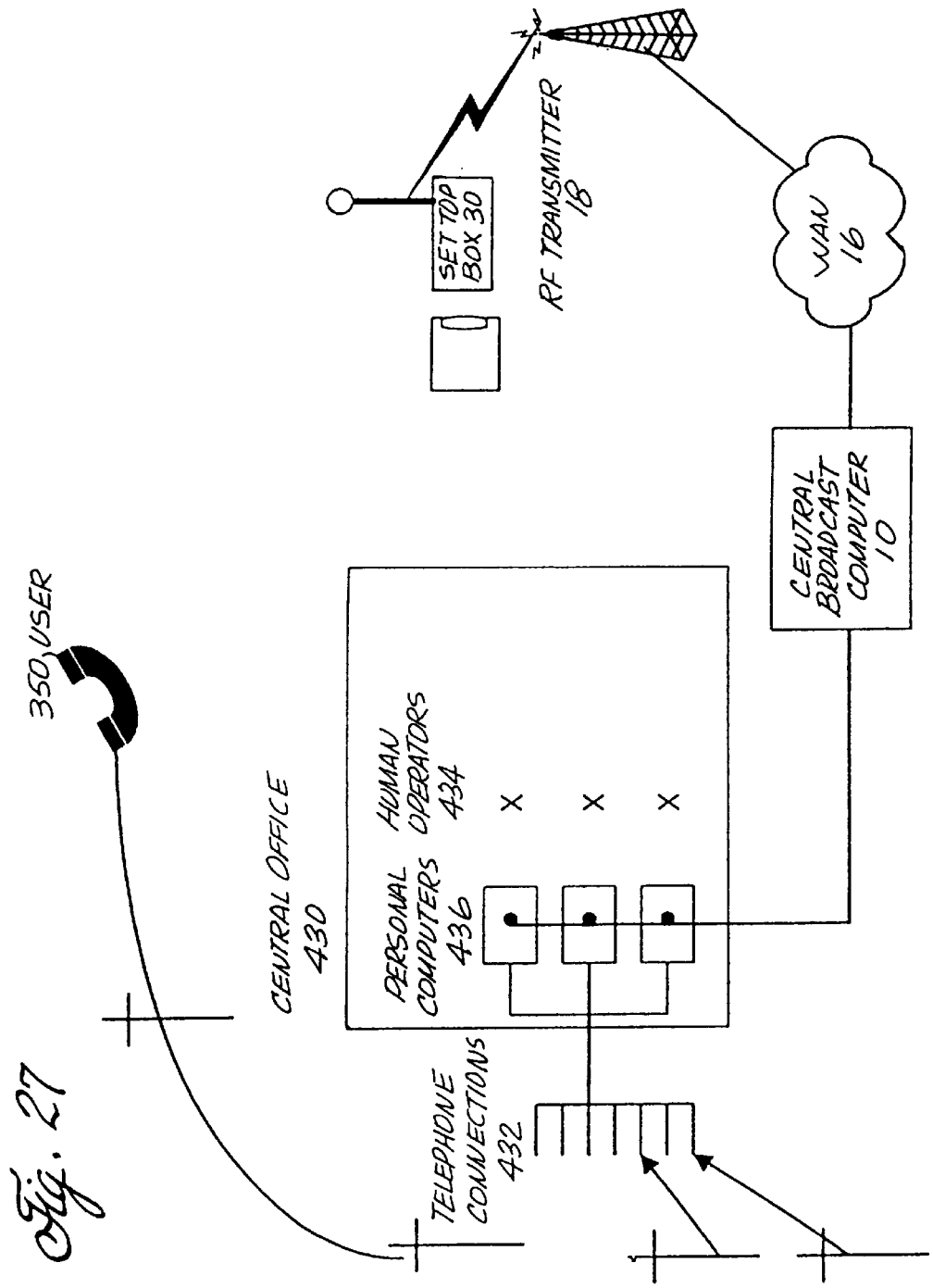
FIG. 27 is a block diagram of the components of the commercial avoidance systems of the present invention.
Figure 28:
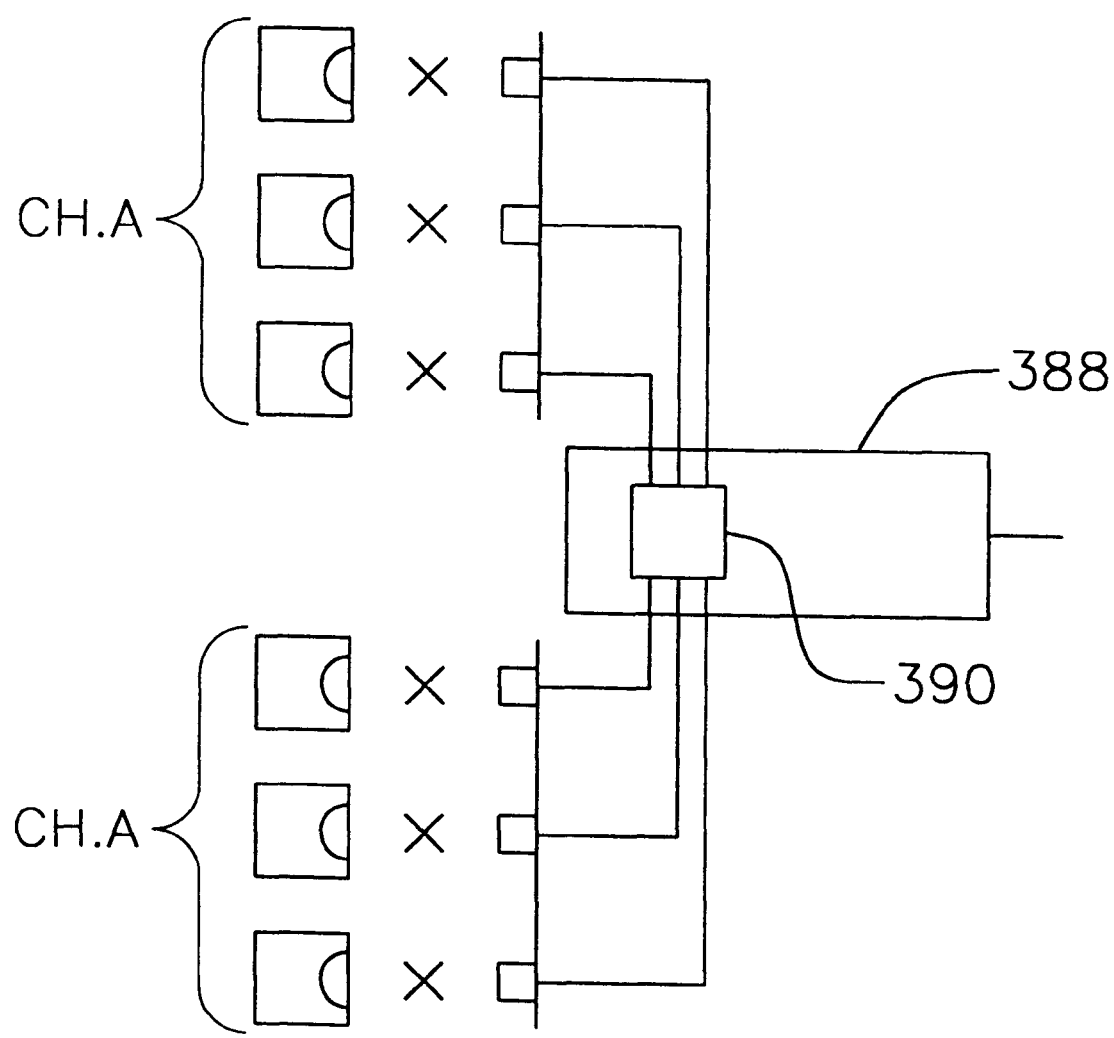
FIG. 28 is a diagram of the commercial monitoring center as shown in FIG. 27.

The system 5 accomplishes "commercial avoidance" as follows. As shown in FIG. 27, in one embodiment which may be used in areas in which television programming is transmitted to local television affiliates and rebroadcast without delay (typically the Eastern and Pacific U.S. time zones), commercial monitoring centers 380 monitor television programming on those channels and determine when a commercial break begins and ends. At the beginning and end of each commercial break, the commercial monitoring center 380 transmits to the central broadcasting computer 10 a message indicating the channel on which a commercial break has begun. The central broadcasting computer 10 then transrits, as system information, Control Information over the WAN 16 for transmission by RF transmitters 386 (corresponding to paging terminals 18 in FIG. 1) in those areas in which the commercial break has occurred. The Control Information will be received by individual set-top boxes 30 and decoded and interpreted by their CPUs to be commercial avoidance information.

Figure 29:
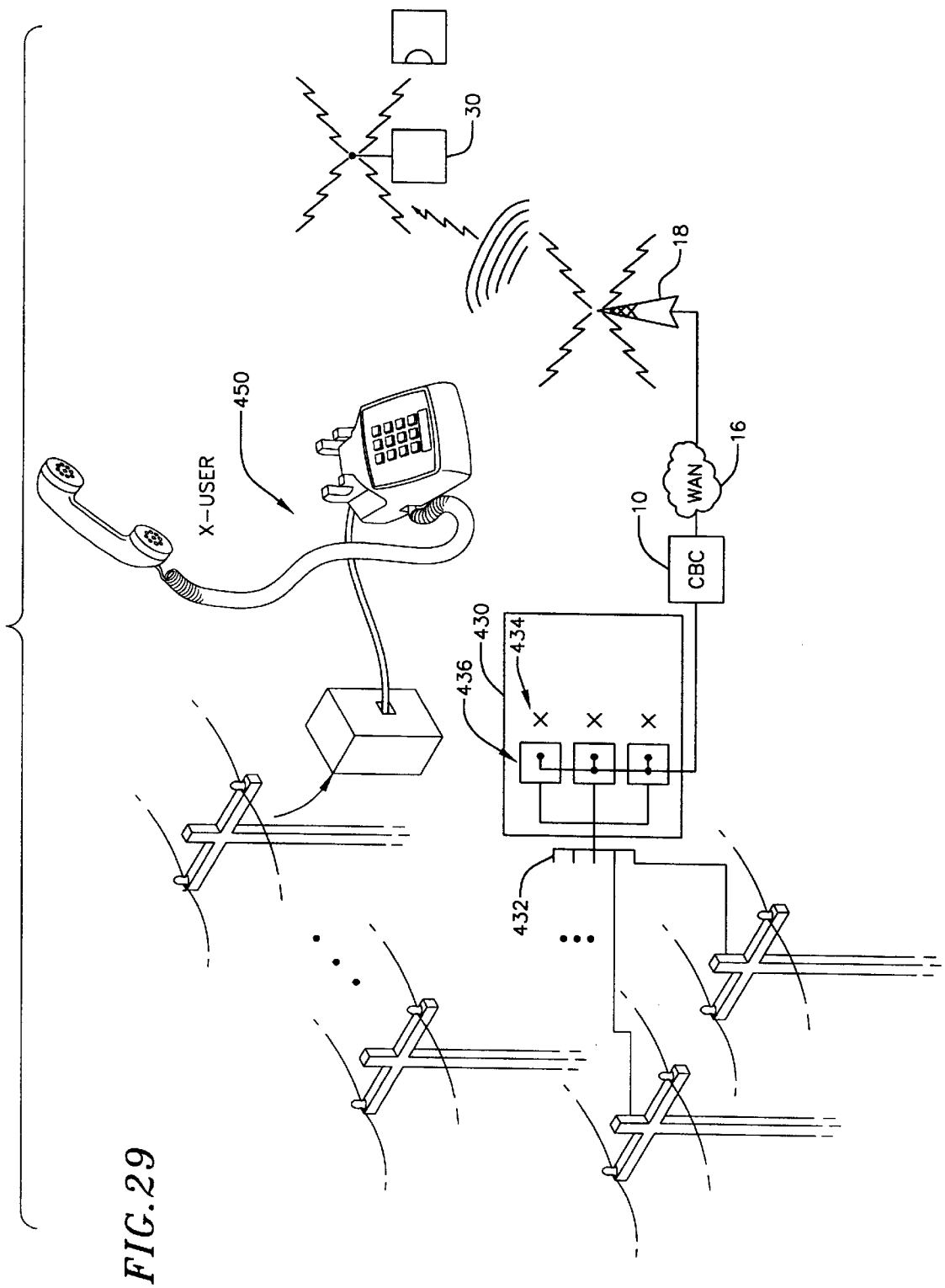
FIG. 29 is a diagram of the components utilized by the system of the present invention to process remotely issued commands.

As shown in FIG. 26, in one embodiment the commercial monitoring center 380 includes at least one human observer monitoring a television 386 tuned to the channel being monitored. At the beginning and end of a commercial break on the channel being monitored by observer 384, observer 384 will depress a button 386 indicating to a computer 388 the beginning and end of the commercial break on such channel. The computer 386 will then transmit a message to the central broadcasting computer 10, as described above. In an alternate embodiment shown in FIG. 29, individual observer error is minimized by causing multiple observers to view each channel and depress individual buttons at the beginning and end of a commercial break. Logic module 390 of the computer 388 then logically combines the signals generated by the buttons of the observers watching the same channels and sends a commercial break indication to the central broadcast computer when it receives indications from more than a predetermined number of observers (e.g. three) identifying the beginning and end of a commercial break on the channel.

The commercial avoidance feature can also be provided in areas in which the transmission of programming is delayed from an original transmission, without requiring providing observers for those areas as described above. In that operation, the commercial monitoring center 380 not only enables transmission of Command Information identifying the beginning and end of a commercial break in original transmission areas, that is, in areas in which program transmission is not delayed, it also enables transmission of Command Information in delayed transmission areas which identifies the times at which commercial breaks begin and end, which the set-top boxes 30 in those areas will store in their respective memories 38. If a user uses his or her set-top box 30 to control display or recording of a program for which commercial avoidance information has been provided, the set-top box 30 can use the commercial break begin and end times in the memory to control volume in connection with display of a program by the television receiver 32, as well as to control pause of a VCR in connection with recording of a program by a VCR.

3. Remote Operation.

As illustrated by FIG. 27, the system includes a central office 430 having a plurality of telephone connections 432, human operators 434 and terminals or stand-alone personal computers 436 networked to the central information broadcasting computer 10. In the event that a user 350 desires to issue commands to his set-top box while remote from the box, for example, if he forgot to program his VCR to record a program, he may telephone the central office 430, identify himself and provide a security code to the operator 434. If the operator verifies the user's identity (in a preferred embodiment, using a commercially available database including user name, security codes and set-top box serial numbers), the user may tell the operator what command he would like to remotely issue to his set-top box 446. The operator will then access the central information broadcasting computer 10 through his terminal or personal computer 436, and instruct the central information broadcasting computer 10 to transmit an "individualized command" through the WAN 442 to the RF transmitter 444 servicing the user's area. An "individualized command" is a control command containing the serial number of the user's set-top box 30, and which will be disregarded by all set-top boxes other than the set-top box 30 having that serial number. Upon receipt and recognition of the individualized command by the user's set-top box 30, the user's set-top box 30 will execute the command.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A method for presenting television program listings to television viewers comprising the steps of:

transmitting information including program schedule listings from a variety of sources to a central computer that stores the transmitted information in its own databases;

transmitting the stored information over a wide area network to a plurality of pager terminals that cover a specific geographic region;

converting the information at the pager terminals into program listings data suitable for broadcasting from the pager terminals;

broadcasting the television program listing data from the pager terminals;

receiving the data in the vicinity of each of the plurality of television receivers that have a display screen;

storing the received data in a memory associated with each television receiver; and processing the data for display of television program listings.

2. The method of claim 1, in which the broadcasting step broadcasts the television program listings during the night.

3. The method of claim 1, in which the broadcasting step brodacasts the television program listings part of the time, depending upon usage of the pager terminals.

4. The method of claim 1, in which the data is broadcast in the 931 MHz frequency band.

5. The method of claim 1, in which the data is broadcast in analog form.

6. The method of claim 5, in which the data is converted to digital form before the storing step.

7. The method of claim 3, in which the broadcasting step broadcasts the television program listings during the night.

8. The method of claim 1, additionally comprising the step of displaying the processed television program listings on the screen as an electronic program guide.

9. The method of claim 8, additionally comprising the step of displaying a television program on the screen instead of the electronic program guide.

10. Apparatus for alternatively displaying television program listings and a television program, the apparatus comprising:

a television monitor having a display screen;

first means for intercepting a television signal from a first transmission link;

means for selecting a television program from the intercepted television signal;

second means independent of the first means for intercepting from a second transmission link a pager signal that carries television program listing data;

means for storing the television program listing data in memory;

means for displaying some of the program listings of the stored data on the screen; and means for substituting the selected television program on the screen for the displayed program listings.

11. The apparatus of claim 10, in which the displaying means comprises means for processing the data for display of television program listings on the screen and means for connecting the processing means to the monitor.

12. The apparatus of claim 11, in which the monitor, the first means, the selecting means, and the substituting means are housed in a television set; the second means, the storing means, and the processing means are housed in a set top box; and the connecting means includes a cable from the set top box to the television set.

13. The method of claim 1, wherein the transmitting is in a TCP/IP communications format.

* * * * *

UNITED STATES PATENT AND TRADEMARK OFFICE
CERTIFICATE OF CORRECTION

PATENT NO. : 6,233,734 B1
DATED : May 15, 2001
INVENTOR(S) : Douglas B. Macrae and Thomas E. Westberg It is certified that error appears in the above-identified patent and that said Letters Patent is hereby corrected as shown below:

<u>Title page,</u>
Item [73], Assignee, should read -- Gemstar Development Corporation , Pasadena, CA (US) --.

<u>Drawings,</u>
FIG. 1, Sheet 1, at the top FIG. 1 replace "TRANSMISSION SUBSYSTEN 6" with -- TRANSMISSION SUBSYSTEM 6 --.
FIG. 10, Sheet 5, in FIG. 10 in the second box on the left replace "COMMAN INFORMATION 152" with -- COMMAND INFORMATION 152 --.

<u>Column 20,</u>
Line 19, replace "brodacasts" with -- broadcasts --.

Signed and Sealed this

Ninth Day of July, 2002

*Attest:*

JAMES E. ROGAN
*Attesting Officer*    *Director of the United States Patent and Trademark Office*